United States Patent
Akiho et al.

(10) Patent No.: US 7,183,987 B2
(45) Date of Patent: Feb. 27, 2007

(54) ANTENNA APPARATUS, AND COMMUNICATIONS APPARATUS USING SAME

(75) Inventors: Hiraku Akiho, Miyagi (JP); Yutaka Okazaki, Tokyo (JP); Kazuo Goto, Kanagawa (JP); Akihiro Kikuchi, Chiba (JP)

(73) Assignee: Sony Corporation, Tokyo (JP)

( * ) Notice: Subject to any disclaimer, the term of this patent is extended or adjusted under 35 U.S.C. 154(b) by 12 days.

(21) Appl. No.: 11/244,727

(22) Filed: Oct. 6, 2005

(65) Prior Publication Data

US 2006/0028384 A1 Feb. 9, 2006

Related U.S. Application Data

(63) Continuation of application No. 10/497,111, filed as application No. PCT/JP03/10984 on Aug. 28, 2003, now Pat. No. 7,000,837.

(30) Foreign Application Priority Data

Sep. 27, 2002 (JP) ............... 2002-284177
Jan. 9, 2003 (JP) ............... 2003-003739

(51) Int. Cl.
*H01Q 11/12* (2006.01)
(52) U.S. Cl. ...................... 343/742; 343/867
(58) Field of Classification Search ............... 343/742, 343/867, 700 MS, 702; 235/451, 493
See application file for complete search history.

(56) References Cited

U.S. PATENT DOCUMENTS

| | | | |
|---|---|---|---|
| 5,424,527 A | 6/1995 | Takahira | |
| 5,574,273 A | 11/1996 | Nakagawa et al. | |
| 5,583,474 A | 12/1996 | Mizoguchi et al. | |
| 5,710,421 A | 1/1998 | Kokubu | |
| 5,764,196 A | 6/1998 | Fujimoto et al. | |
| 5,821,525 A | 10/1998 | Takebayashi | |
| 6,481,623 B1* | 11/2002 | Grant et al. | ............... 235/449 |
| 6,591,494 B2 | 7/2003 | Okamura et al. | |
| 6,593,167 B2 | 7/2003 | Dobashi et al. | |
| 6,975,834 B1* | 12/2005 | Forster | ............... 455/277.2 |
| 6,992,630 B2* | 1/2006 | Parsche | ............... 343/700 MS |
| 2001/0000659 A1 | 5/2001 | Hayashi et al. | |
| 2003/0016506 A1 | 1/2003 | Fujii | |
| 2003/0178495 A1* | 9/2003 | Jones et al. | ............... 235/492 |
| 2004/0104268 A1* | 6/2004 | Bailey | ............... 235/439 |
| 2004/0169087 A1* | 9/2004 | Lasch et al. | ............... 235/493 |
| 2004/0256468 A1 | 12/2004 | Akiho et al. | |

FOREIGN PATENT DOCUMENTS

| | | |
|---|---|---|
| DE | 19542900 A1 | 11/1995 |
| JP | 09139698 | 11/1995 |
| JP | 8-16745 A | 1/1996 |
| JP | 9-284038 A | 10/1997 |
| JP | 10-107531 A | 4/1998 |
| JP | 10-157353 A | 6/1998 |
| JP | 2000-68891 A | 3/2000 |
| JP | 2000-162314 A | 6/2000 |
| JP | 2002-298095 A | 10/2002 |
| JP | 2002-324215 A | 11/2002 |
| JP | 2003-99733 A | 4/2003 |

* cited by examiner

*Primary Examiner*—Trinh Dinh
*Assistant Examiner*—Huedung Mancuso
(74) *Attorney, Agent, or Firm*—Wolf, Greenfield & Sacks, P.C.

(57) ABSTRACT

An antenna apparatus (60) is provided which is used in a recorder and/or player to write and read data to and from a contactless IC card (1). The antenna apparatus (60) includes a loop coil (61) to radiate an electromagnetic field for magnetic coupling with a loop coil (4) at the IC card (1) to send and receive data to and from the IC card (1), and a magnetic sheet (62) disposed to face the main side of the loop coil (61), opposite to the main side facing the IC card (1). The magnetic sheet (62) has the specific permeability $\mu'$ and product $Ms \cdot t$ of saturation magnetization $Ms$ and thickness $t$ thereof set in accordance with a necessary range of communications with the contactless IC card (1).

9 Claims, 17 Drawing Sheets

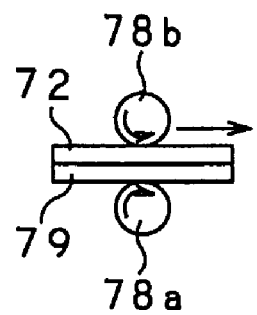
FIG.29
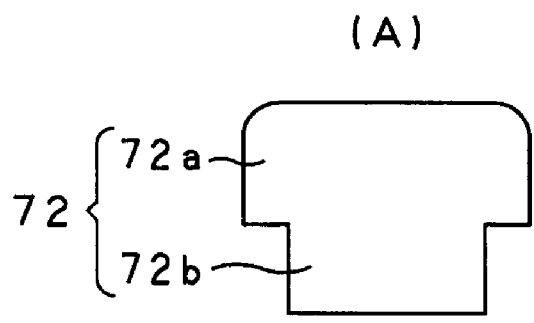 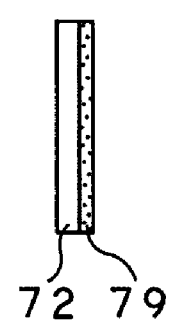
FIG.30A    FIG.30B
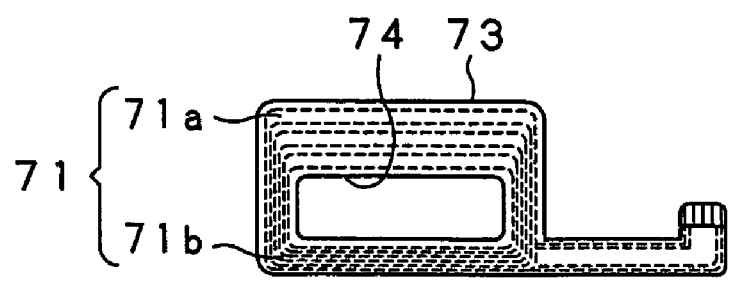
FIG.31

US 7,183,987 B2

ANTENNA APPARATUS, AND COMMUNICATIONS APPARATUS USING SAME

This application is a continuation of application Ser. No. 10/497,111, filed on May 27, 2004, now U.S. Pat. No. 7,000,837 entitled ANTENNA APPARATUS, AND COMMUNICATIONS APPARATUS USING SAME, which, in turn, claims priority under 35 U.S.C. 371 and 37 CFR 1.495 to PCT/JP03/10984, filed Aug. 28, 2003, which, in turn, claims the priority of the Japanese Patent Application No. 2002-284177 filed on Sep. 27, 2002 and No. 2003-3739 filed on Jan. 9, 2003, the entirety of which is incorporated by reference herein.

TECHNICAL FIELD

The present invention relates to a reader/writer antenna apparatus for writing and reading data to and from a contactless IC (integrated circuit) card adopting the technique of electromagnetic-inductive coupling and a communication apparatus using the antenna apparatus.

BACKGROUND ART

Recently, a so-called RFID (radio frequency identification) system using a contactless IC card, IC tag or the like has been introduced into the fields of art such as an automatic ticket checker used in the railway station, security system for checking people going to enter or exit from a building, electronic money system, etc. As schematically illustrated in FIG. 1, the RFID system includes a contactless IC card 100 and a reader/writer 101 to write and read data to and from the IC card 100. The RFID system adopts the theory of electromagnetic induction. An electromagnetic field radiated from a loop antenna 102 provided at the reader/writer 101 is coupled by the electromagnetic induction to a loop antenna 103 provided at the IC card 100 to provide communications between the IC card 100 and reader/writer 101.

In the above RFID system, the IC card has not to be inserted into the reader/writer to put metallic contacts into contact with each other as in the conventional contactless IC card systems. Therefore, data can be written to, and read from, the IC card easily and quickly. Also, in the RFID system, the electromagnetic field radiated from the reader/writer 101 provides a necessary power to the IC card 100 and thus any power source such as a battery or cell has not to be provided in the IC card. Therefore, the IC card used in the RFID system can be excellent in maintainability, lower in price and higher in reliability.

In the above RFID system, the loop antenna 102 provided at the reader/writer 101 should be able to radiate an electromagnetic field having a certain degree of magnetic strength in order to assure a satisfactory range of communications between the IC card 100 and reader/writer 101.

Generally, the loop antenna 102 for the reader/writer 101 includes a loop coil 200 formed from a plane winding of a conductor as shown in FIG. 2. The loop coil 200 is formed to have winding sections thereof, opposite to each other across the center of the loop coil 200, disposed symmetrically to be equal in interval and width to each other. It should be noted that actual examples of the loop antenna of this type are found in the Japanese Published Unexamined Patent Application No. 1998-144048 in which there is disclosed an antenna provided at a main unit and connected to a reader/writer module, and also in the Japanese Published Unexamined Patent Application No. 2001-331829 in which there are disclosed antennas AG1, AG2 and AG3 of a reader/writer RW.

In the above symmetric loop antenna 102 for the reader/writer 101, the magnetic field is distributed symmetrically as shown in FIG. 3.

FIG. 4 shows the dependence upon the card position of the strength of a current induced by the loop antenna 102 to the IC card 100. As shown, two communication areas $S_1'$ and $S_2'$ are formed in positions, respectively, opposite to each other across the center of the loop coil 200. More particularly, the communication area $S_1'$ assures an ideal magnetic coupling. Namely, magnetic fields developed at four sides of the loop antenna 102 at the reader/writer 101 are inductively coupled to those developed at four sides of the loop antenna 103 at the IC card 100, opposite to the four sides, respectively, of the loop antenna 102. Outside the communication area $S_1'$, there is an area where magnetic fields crossing the loop antenna 103 at the reader/writer 101 cancel each other in a central area where the magnetic fields developed around the loop antenna 102 at the reader/writer 101 are inverted in direction. In this outer area, the induced current will have a lower level than the necessary level for the communications. Outside the above outer area, there is the communication area $S_2'$ where only one of the four sides of the loop antenna 102 at the reader/writer 101 is coupled to one of the four sides of the loop antenna 103 at the IC card 100. Therefore, the communication area $S_2'$ is narrower than the communication area $S_1'$, and the induced current in this communication area $S_2'$ is smaller than that in the communication area $S_1'$.

Note that in FIG. 4, the origin "0" of the horizontal axis indicates the center of the loop antenna 102 at the reader/writer 101 and the positive-going direction indicates a direction from the center (origin "0") toward outside of the IC card 100. The vertical axis indicates the strength of the current electromagnetically induced in the loop antenna 103 at the IC card 100 under the action of the magnetic field in the loop antenna 102 at the reader/writer 101. Communications are possible in an area where the strength of the induced current has a value larger than a value indicated with a dashed line s' in FIG. 4.

Note here that when the communication area $S_1'$ is continuously wider as far as possible outwardly of a point, namely, the origin "0", where the center of the loop antenna 103 at the IC card 100 coincides with that of the loop antenna 102 at the reader/writer 101, the RFID system will be easier to use.

That is to say, in a direction the origin "0" toward outside of the above conventional loop coil 200, the communication area $S_1'$ is followed by a non-communication area once, and then by the communication area $S_2'$. It is desirable from the practical point of view that no non-communication area should exist between the communication areas $S_1'$ and $S_2'$ or only the communication area $S_1'$ should spread.

The above loop antenna 102 for the reader/writer 101 should not be installed as it is to a housing made of an Mg alloy or the like because it will not normally operate due to the influence of an eddy current or the like. In case the loop coil 200 is installed in a metallic housing 300 as shown in FIG. 5, a magnetic sheet 301 is interposed between the metallic housing 300 and loop coil 200 with a sheet 302 of polycarbonate or the like being disposed as a protective material over the loop coil 200. Also in this case, the loop antenna 102 for the reader/writer 101 cannot efficiently radiate any electromagnetic field to the IC card 100, and thus the range of communications between the IC card 100 and reader/writer 101 is narrow.

Further, in case a resin-made housing 400 is used to house the loop coil 200 as shown in FIG. 6, a spacer 402 has to be disposed between an electric circuit board 401 inside the resin-made housing 400 and the loop antenna 102 to prevent any noise from being electromagnetically induced, which will lead to an increased thickness of the housing 400. Moreover, the conventional loop antenna 102 for the reader/writer 101 is nearly equal in dimensions to the loop antenna 103 at the IC card 100. The conventional loop antenna 102 of this type for the reader/writer 101 can hardly be formed smaller and thinner.

Although the conventional RFID system has the above technical problems, the aforementioned reader/writer 101 is installed on a resin-made or metallic housing of some small portable-type electronic devices for example. In this case, the loop antenna 102 for the reader/writer 101 should be formed equal or smaller in outside dimensions to or than, and thinner than, the IC card 100.

Different from the stationary electronic devices, the small portable-type electronic device is limited in size to assure its portability. Therefore, any well worked-out disposition of the loop coil in a space inside the housing will not effectively solve the problems in assuring a space for the loop coil installed inside the housing, that is enough to inhibit the electromagnetic field radiated from the loop antenna 102 from adversely affecting the electronic circuit board and the like disposed near the inner wall of the housing as well as to prevent the metallic housing from affecting the loop antenna 102. Hence, a demand is made for a new method of preventing the metallic housing from affecting on the loop antenna 102 and the electromagnetic field radiated from the loop antenna 102 itself from affecting the electronic circuit board and the like.

Also, different from the stationary electronic devices, the small portable-type electronic device should be operable with a less power consumption. Therefore, the drive current for the loop antenna 102 cannot be smaller, and thus the loop antenna 102 has to be formed to have a new, high efficiency construction which assures a sufficient magnetic field strength even with a small drive current.

Further, because of the limited location of installation and geometric relation of the reader/writer 101 with location of any other functional part such as a keyboard or the like, a desired position of transmission and reception of the reader/writer 101 cannot always be at the center of the loop antenna 102, which will not meet a demand peculiar to the small portable-type electronic device, such as a requirement for a freedom of setting the transmission/reception position to attain an easier operability of the electronic device itself.

Note here that besides the above working-out of the spatial disposition, there have been proposed techniques of preventing the metallic housing from affecting the loop antenna 102, including, as typical ones, an IC tap antenna made of a plate-shaped magnetic material to suppress the influence of a metallic member (as in the Japanese Published Unexamined Patent Application No. 2001-331772) and a card loader antenna made of a magnetic material to suppress the influence of a metallic member by deflecting the magnetic field in the antenna (as in the Japanese Published Unexamined Patent Application No. 2002-123799).

Any of the aforementioned conventional techniques cannot implement any compact and thin loop antenna optimum for a reader/writer in a small portable-type electronic device material- and space-limited in power consumption and location of installation of the loop antenna.

DISCLOSURE OF THE INVENTION

Accordingly, the present invention has an object to overcome the above-mentioned drawbacks of the related art by providing an improved and novel antenna apparatus and a communication apparatus using the antenna apparatus.

The present invention has another object to provide an antenna apparatus capable of expanding the range of communications between an IC card and reader/writer by controlling, and effectively utilizing, the distribution of a radiated electromagnetic field, and a communication apparatus using the antenna apparatus.

The present invention has still another object to provide an antenna apparatus for a reader/writer, formed to be smaller and have a higher performance by reducing the influence of the material of a housing for the antenna apparatus, and a communication apparatus using the antenna apparatus.

The above object can be attained by providing an antenna apparatus connected to a communication apparatus that makes data communication with a contactless IC card by electromagnetic inductive coupling, the apparatus including according to the present invention:

a loop coil for the electromagnetic inductive coupling; and a magnetic member disposed to face the main side of the loop coil, opposite to the main side facing the IC card, and having the specific permeability $\mu'$ and product $Ms \cdot t$ of saturation magnetization Ms and thickness t thereof set on the basis of a range set for communications with the contactless IC card to be possible.

In the above antenna apparatus according to the present invention, the specific permeability $\mu'$ of the magnetic member is 30 or more and the product $Ms \cdot t$ of saturation magnetization Ms and thickness t is 6 emu/cm$^2$ or more.

Also, the magnetic member has a coercive force Hc of 100 e or less.

The magnetic member is formed from a soft magnetic material. The soft magnetic material is a sintered compact of any one of an amorphous alloy, Co—Cr alloy, Fe—Al alloy, Sendust alloy, Fe—Ni alloy, Fe—Co—Ni alloy and a ferrite alloy.

In the above antenna apparatus according to the present invention, the magnetic member has a portion wider than the outermost width of the winding section of the loop coil and a portion narrower than the innermost width of the winding section, the wide portion of the magnetic member being disposed to face the main side of the loop coil, opposite to the main side facing the IC card with the narrow portion being penetrated through the center of the loop coil, while the narrow portion is disposed to face a main-side portion of the loop coil, facing the IC card and where the winding interval of the loop coil is narrow.

In the above antenna apparatus according to the present invention, the magnetic member has a portion wider than the outermost width of the winding section of the loop coil, a portion formed between a pair of cuts made at one end and narrower than the innermost width of the winding section, and a pair of edge pieces formed across the narrow portion between the pair of cuts, the wide portion of the magnetic member being disposed to face the main side of the loop coil, opposite to the main side facing the IC card with the narrow portion being penetrated through the center of the loop coil, while the narrow portion is disposed to face a main-side portion of the loop coil, facing the IC card, and the pair of edge pieces being disposed to face the main side of the loop coil, opposite to the main side facing the IC card.

In the above antenna apparatus according to the present invention, the loop coil is formed from a plane winding of a conductor, whose sections opposite to each other across the center of the loop coil are different in interval from each other. In this loop coil, the winding sections are different in interval from each other in the direction in which the IC card is scanned. Further, this loop coil should desirably be smaller than the loop coil at the IC card, to which it is to be inductively coupled.

Also, the above object can be attained by providing a communication apparatus that makes data communications with a contactless IC card by electromagnetic inductive coupling, the communication apparatus including according to the present invention:

a loop coil for the electromagnetic inductive coupling;

a magnetic member disposed near a metallic member facing the main side of the loop coil, opposite to the main side facing the IC card, and having the specific permeability $\mu'$ and product Ms·t of saturation magnetization Ms and thickness t thereof set on the basis of a range set for communications with the contactless IC card to be possible;

a modulating means for modulating data for transmission to the contactless IC card with a predetermined carrier frequency and supplying the modulated data to the loop coil; and a demodulating means for demodulating data received by the loop coil from the contactless IC card.

In the above communication apparatus according to the present invention, the magnetic member has a portion wider than the outermost width of the winding section of the loop coil and a portion narrower than the innermost width of the winding section, the wide portion of the magnetic member being disposed to face the main side of the loop coil, opposite to the main side facing the IC card with the narrow portion being penetrated through the center of the loop coil, while the narrow portion is disposed to face a main-side portion of the loop coil, facing the IC card and where the winding interval of the loop coil is narrow.

In the above communication apparatus according to the present invention, the magnetic member has a portion wider than the outermost width of the winding section of the loop coil, a portion formed between a pair of cuts made at one end and narrower than the innermost width of the winding section, and a pair of edge pieces formed across the narrow portion between the pair of cuts, the wide portion of the magnetic member being disposed to face the main side of the loop coil, opposite to the main side facing the IC card with the narrow portion being penetrated through the center of the loop coil, while the narrow portion is disposed to face a main-side portion of the loop coil, facing the IC card, and the pair of edge pieces being disposed to face the main side of the loop coil, opposite to the main side facing the IC card.

One side of a surface of a housing of the antenna apparatus used in the above communication apparatus according to the present invention, on which the loop coil is disposed, is formed shorter than the long side of the IC card.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 29 is a schematic diagram of a coating machine.

FIG. 30A is a plan view of the magnetic sheet, and FIG. 30B is a sectional view of the magnetic sheet.

FIG. 31 is a plan view of the loop coil.

BEST MODE FOR CARRYING OUT THE INVENTION

The present invention will be described in detail concerning the antenna apparatus and the communication apparatus using the antenna apparatus as the embodiments thereof with reference to the accompanying drawings.

Figure 7:
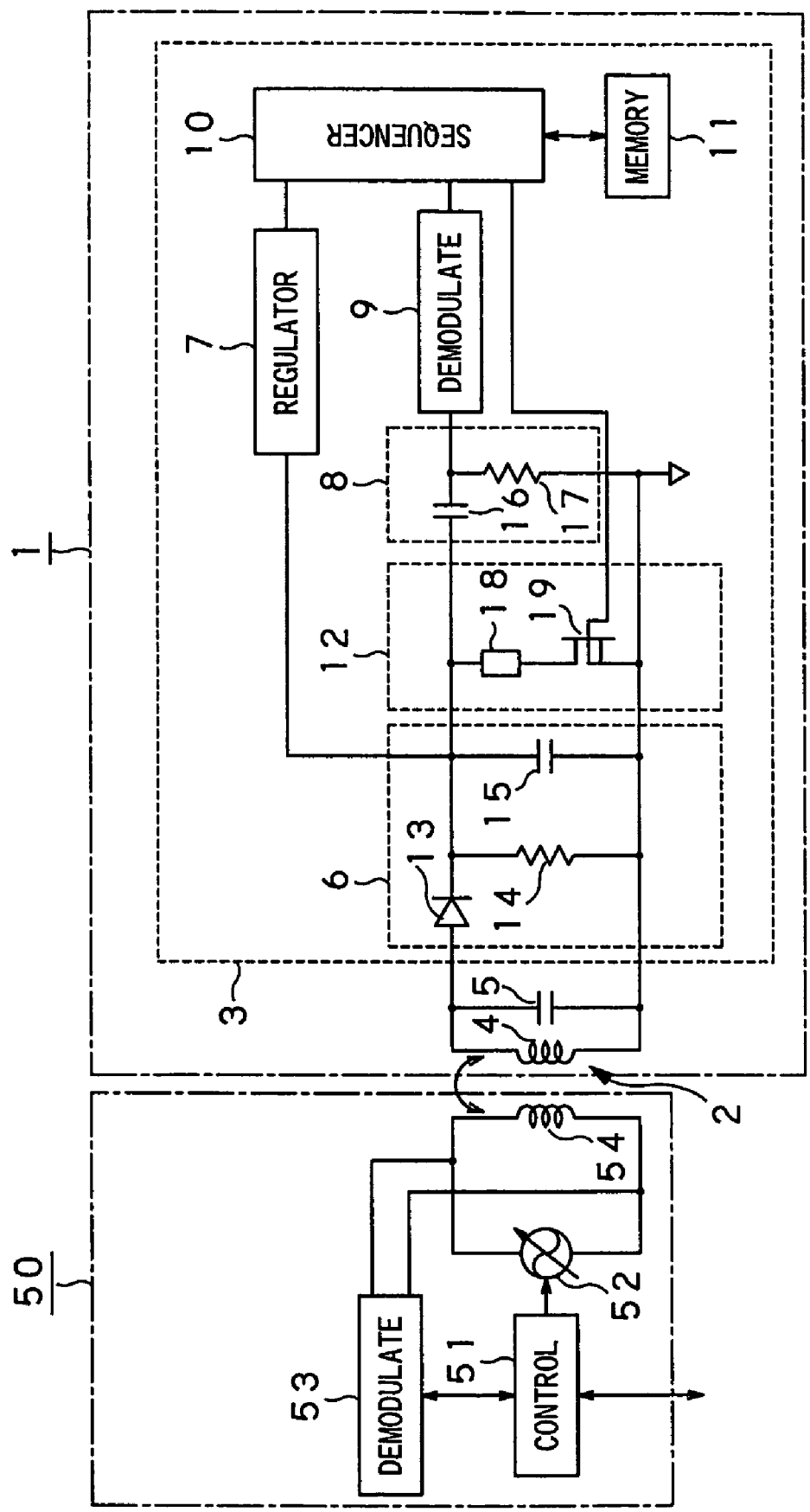
FIG. 7 is a circuit diagram of an RFID system according to the present invention.

As shown in FIG. 7, the RFID system according to the present invention is composed of a contactless IC card 1, and a reader/writer (will be referred to as "R/W" hereunder) 50 to write and read data to and from the IC card 1.

The IC card 1 is of a battery-less type compliant with ISO 7810, for example. Namely, it has no power source such as a battery or cell. The IC card 1 is formed rectangular to have the same size as the so-called credit card, namely, it is palm-sized. The IC card 1 has provided on a circuit board built therein a loop antenna 2 that couples with an electromagnetic field to send and receive data, and an IC (integrated circuit) 3 having integrated therein electronic circuits that make various operations for writing and reading data.

The loop antenna 2 includes a loop coil 4 formed from a plane winding of a conductor, and forms a resonant circuit along with a capacitor 5 connected in parallel therewith. The loop antenna 2 couples with an electromagnetic field radiated from a loop antenna provided at an R/W 50 that will be explained in detail later, converts the electromagnetic field into an electrical signal, and supplies the signal to the IC 3.

The IC 3 includes a rectification circuit 6 to rectify and smooth the electrical signal supplied from the loop coil 4, a regulator 7 to converter the electrical signal supplied from the rectification circuit 6 into a DC power, an HPF (high-pass filter) 8 to extract a high-frequency component from the electrical signal supplied from the rectification circuit 6, a demodulation circuit 9 to demodulate the high-frequency component supplied from the HPF 8, a sequencer 10 to control data write and read correspondingly to data supplied from the demodulation circuit 9, a memory 11 to store the data supplied from the demodulation circuit 9, and a modulation circuit 12 to modulate data to be sent by the loop antenna 4.

The rectification circuit 6 is composed of a diode 13, resistor 14 and a capacitor 15. Of these parts, the diode 13 is connected at the anode thereof to one end of each of the loop coil 4 and capacitor 5 and at the cathode to one end of the resistor 14 and capacitor 15, the resistor 14 and capacitor 15 are connected at the other ends thereof to the other ends of the loop coil 4 and capacitor 5. The rectification circuit 6 outputs the electrical signal resulted by the rectification and smoothing the electrical signal supplied from the loop coil 4 to the regulator 7 and HPF 8.

The regulator 7 is connected to the cathode of the diode 13 in the aforementioned rectification circuit 6 and one end of each of the resistor 14 and capacitor 15. The regulator 7 stabilizes the electrical signal supplied from the rectification circuit 6 by preventing the signal from being varied in voltage due to some data component, and supplies the signal as a DC power to the sequencer 10. Thus, it is possible to suppress a voltage variation caused by a movement of the IC card 1, a voltage variation caused by a change of the power consumption inside the IC card 1, etc. If not suppressed, such voltage variations will lead to a malfunction or the like of the sequencer 10.

The HPF 8 is composed of a capacitor 16 and resistor 17. It extracts the high-frequency component from the electrical signal supplied from the aforementioned rectification circuit 6, and supplies the signal to the demodulation circuit 9.

The demodulation circuit 9 is connected to the other end of a capacitor 16 of the HPF 8 and one end of the resistor 17. It demodulates the high-frequency signal supplied from the HPF 8, and outputs the demodulated signal to the sequencer 10.

The sequencer 10 incorporates a ROM (read-only memory) and RAM (random-access memory), and is connected to the aforementioned demodulation circuit 9. The sequencer 10 stores a signal (command) supplied from the demodulation circuit 9 into the RAM, analyzes the command according to a program held in the ROM, and reads data from the memory 11 as necessary on the basis of the result of analysis or writes data supplied from the demodulation circuit 9 into the memory 11. The sequencer 10 generates a response signal responsively to the command supplied, and supplies the signal to the modulation circuit 12.

The memory 11 is a non-volatile memory such as an EEPROM (electrically erasable programmable read-only memory) needing no power for holding data, and connected to the aforementioned sequencer 10. The memory 11 stores data supplied from the demodulation circuit 9 according to the result of analysis from the sequencer 10.

The modulation circuit 12 is formed from a series circuit composed of an impedance 18 and an EFT (field effect transistor) 19. The impedance 18 is connected at one end thereof to the cathode of the diode 13 in the aforementioned rectification circuit 6, and at the other end to the drain of the FET 19. The FET 19 is connected at the source thereof connected to the ground potential point, and at the gate to the sequencer 10. The modulation circuit 12 is connected in parallel to the loop coil 4 included in the aforementioned resonant circuit and controls the FET 19 to make a switching operation according to a signal supplied from the sequencer 10 in order to change the load of the impedance 18 to the loop coil 4. That is, the modulation circuit 12 adopts the so-called additional modulation method.

The R/W 50 includes a control circuit 51 to control data to be sent and received, a modulation circuit 52 to modulate the data and the power for operation of the IC card 1, a demodulation circuit 53 to demodulate received data, and a loop antenna 54 that couples with an electromagnetic field to send and receive data.

In the R/W 50, the control circuit 51 generates a variety of control signals according to an external instruction and a program held therein, for example, in order to control the modulation circuit 52 and demodulation circuit 53, and also generates send data corresponding to an instruction and supplies the data to the modulation circuit 52. Also, the control circuit 51 generates a reproduce signal according to response data from the demodulation circuit 53, and outputs the data to outside.

In the modulation circuit 52, a transmitter modulates the send data supplied from the control circuit 51, and supplies the modulated signal to the loop antenna 54.

The demodulation circuit 53 demodulates the modulated wave supplied from the loop antenna 54, and supplies the demodulated data to the control circuit 51.

The loop antenna 54 also includes a loop coil formed from a plane winding of a conductor. It radiates an electromagnetic field corresponding to a modulated wave supplied from the modulation circuit 52, and detects a variation of the load to the loop coil 4 at the IC card 1. It should be noted that the loop antenna 54 has a resonance capacitor connected in parallel or in series thereto depending upon an antenna driving method adopted in the R/W 50 as the case may be.

In the RFID system constructed as above, when the IC card 1 is given an instruction for writing a predetermined data, the control circuit 51 in the R/W 50 generates a write command signal on the basis of the instruction, and also generates send data corresponding to the instruction and that is to be write data, and supplies the data to the modulation circuit 52. The modulation circuit 52 modulates the amplitude of oscillation signal on the basis of the supplied signal, and supplies the modulated signal to the loop antenna 54. The loop antenna 54 will thus radiate an electromagnetic wave corresponding to the supplied modulated signal.

Note here that the resonant frequency of the resonant circuit composed of the loop coil 4 and capacitor 5 included in the IC card 1 is set to 13.56 MHz, for example, as a value corresponding to the oscillation frequency that is a carrier frequency from the R/W 50. The oscillation circuit receives the radiated electromagnetic field by oscillation, converts it into an electrical signal, and then supplies the electrical signal to the IC 3. The electrical signal resulted from the electromagnetic field is supplied to the rectification circuit 6, rectified and smoothed by the rectification circuit 6 and then supplied to the regulator 7. The regulator 7 suppresses the voltage variation (data component) of the electrical signal supplied from the rectification circuit 6, and supplies the electrical signal as a DC power to the sequencer 10 after the electrical signal is stabilized.

The signal rectified and smoothed by the rectification circuit 6 is supplied to the HPF 8 via the modulation circuit 12 where a high-frequency component will be extracted from the signal, and then the high-frequency signal is supplied to the demodulation circuit 9. The demodulation circuit 9 demodulates the supplied high-frequency signal and supplies the demodulated signal to the sequencer 10. The sequencer 10 stores the signal supplied from the demodulation circuit 9 as a command into the RAM, analyzes the signal according to the program held in the ROM, and writes write data supplied from the demodulation circuit 9 into the memory 11 on the basis of the result of analysis.

On the other hand, in case the signal supplied from the demodulation circuit 9 is a command corresponding to the read instruction, the sequencer 10 will read data corresponding to the read instruction from the memory 11. The sequencer 10 switches the FET 19 in the modulation circuit 12 correspondingly to the read data. That is, in the modulation circuit 12, when the FET 19 is turned on, the loop coil 4 is connected in parallel to the impedance 18. When the FET 19 is turned off, the parallel connection between the impedance 18 and loop coil 4 is broken. As a result, the impedance of the loop antenna 54 at the R/W 50, magnetically connected to the loop antenna 2 at the IC card 1, varies correspondingly to the read data. Therefore, the terminal potential of the loop antenna 54 will vary correspondingly to the impedance variation, and the R/W 50 is thus enabled to receive the read data since the variation is demodulated by the demodulation circuit 53.

As above, communications are made between the IC card 1 and R/W 50, and the R/W 50 can thus write or read data to or from the IC card 1 in a non-contact manner or by radio.

Figure 8:
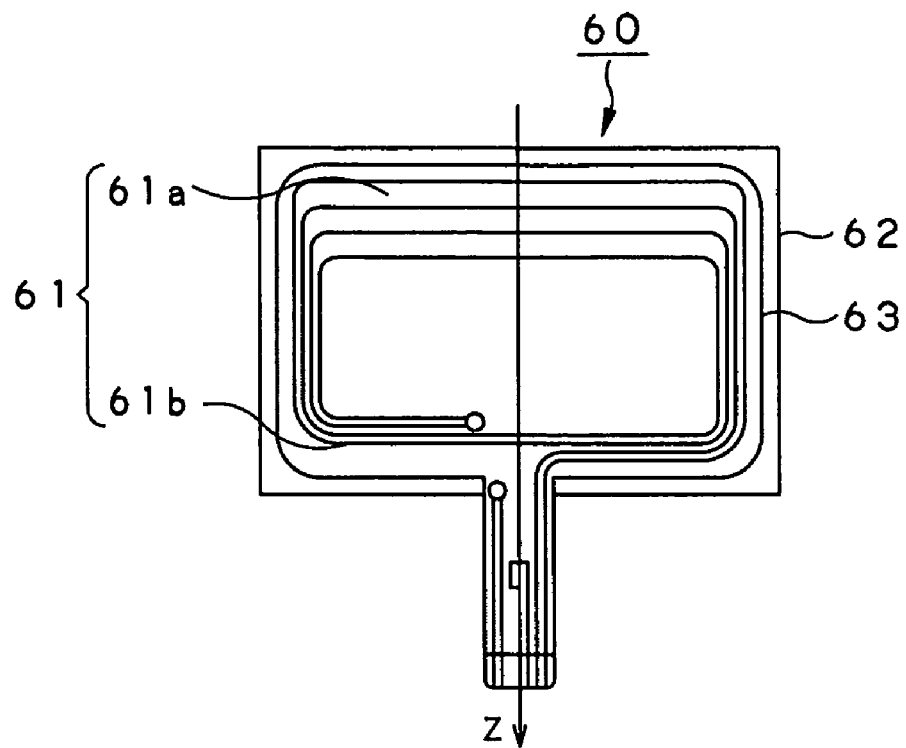
FIG. 8 is a plan view of a plane asymmetric loop antenna.

Note here that the aforementioned loop antenna 54 at the R/W 50 may be an antenna apparatus constructed according to the present invention as shown in FIG. 8. The antenna apparatus is generally indicated with a reference 60.

As shown in FIG. 8, the antenna apparatus 60 includes a loop coil 61 for inductive coupling of an electromagnetic field, and a magnetic sheet 62 disposed to face the main side of the loop coil 61, opposite to the main side facing the IC card 1.

The loop coil 61 is formed by etching or other processing of an electroconductive metal foil of electrolytic copper or the like formed on both sides of an insulation film or substrate 64 made of a flexible film of polyimide or mica. It should be noted that the method of forming the loop coil 61 is not limited to the above one but the loop coil 61 may be formed by printing an electroconductive paste such as a silver paste on the film or substrate 64 to form a conductor pattern that provides the loop coil 61 or by sputtering a metal target to form, on the substrate 64, a conductor pattern that provides the loop coil 61.

Also, in the loop coil 61, the winding sections thereof opposite to each other across the center of the loop coil 61 are disposed asymmetrically to be different in interval and width from each other in one direction. That is, the loop coil 61 includes an upper winding section 61a larger in interval and width in one direction, that is, a vertical direction indicated with an arrow Z in FIG. 8, and a lower winding section 61b smaller in interval and width in that direction Z.

On the other hand, the magnetic sheet 62 is formed to have a rectangular shape larger than the loop coil 61 to cover the latter completely within the main side thereof. This antenna apparatus 60 has the magnetic sheet 62 attached to the main side of the loop coil 61, opposite to the main side facing the IC card 1.

Figure 3:
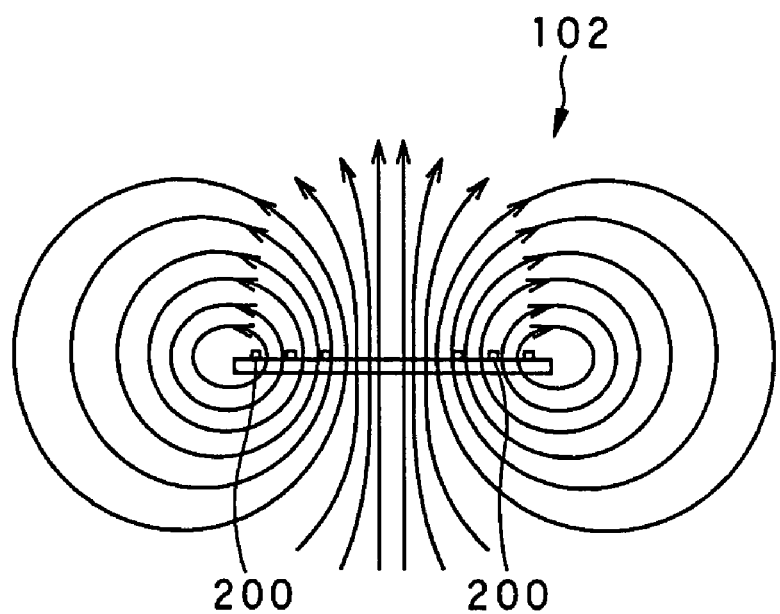
FIG. 3 shows the distribution of a magnetic field developed around the conventional R/W loop antenna.
Figure 4:
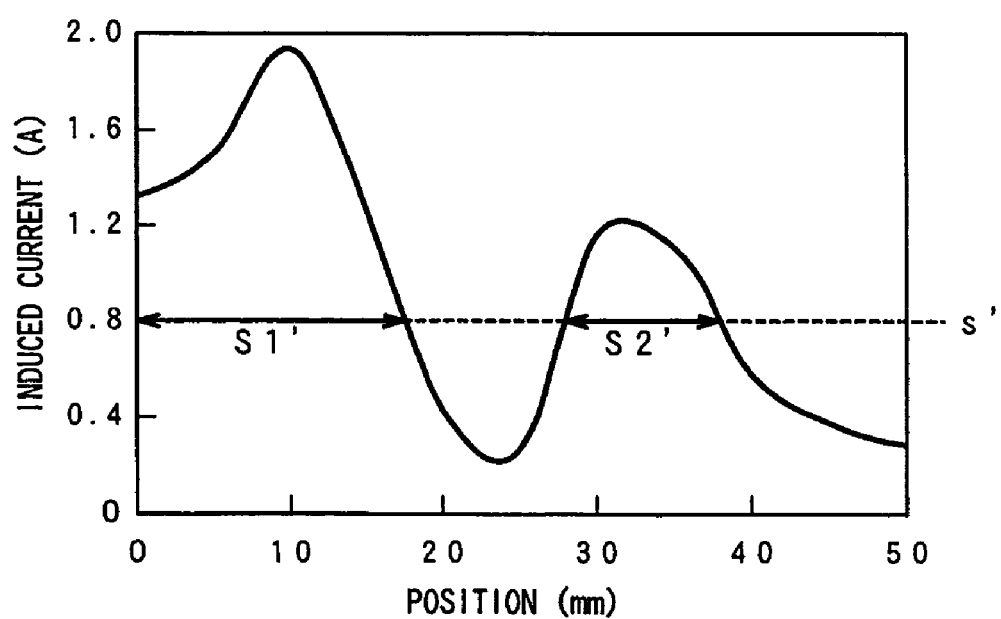
FIG. 4 shows a characteristic curve of a performance of communications between the conventional R/W loop antenna and IC card.
Figure 5:
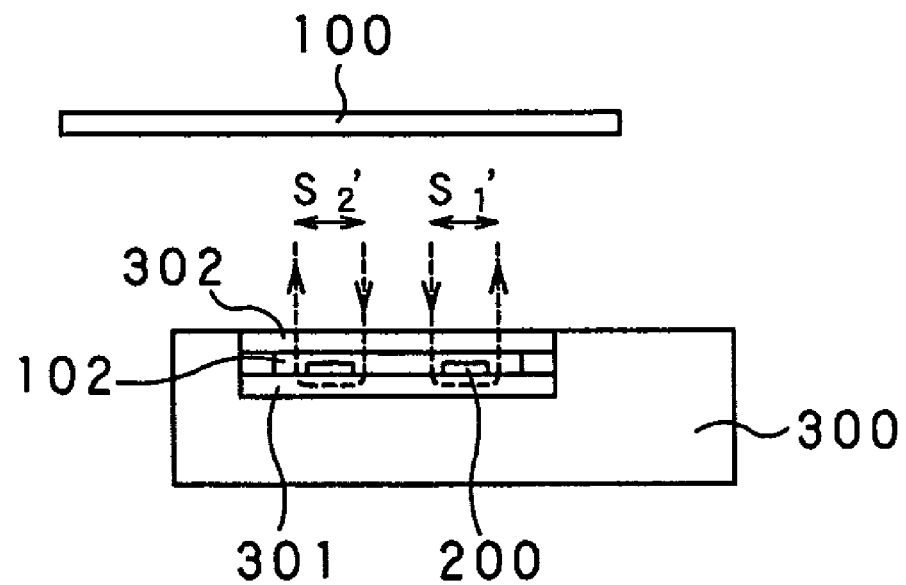
FIG. 5 shows the distribution of a magnetic field developed around the conventional R/W loop antenna disposed in the metallic housing.
Figure 6:
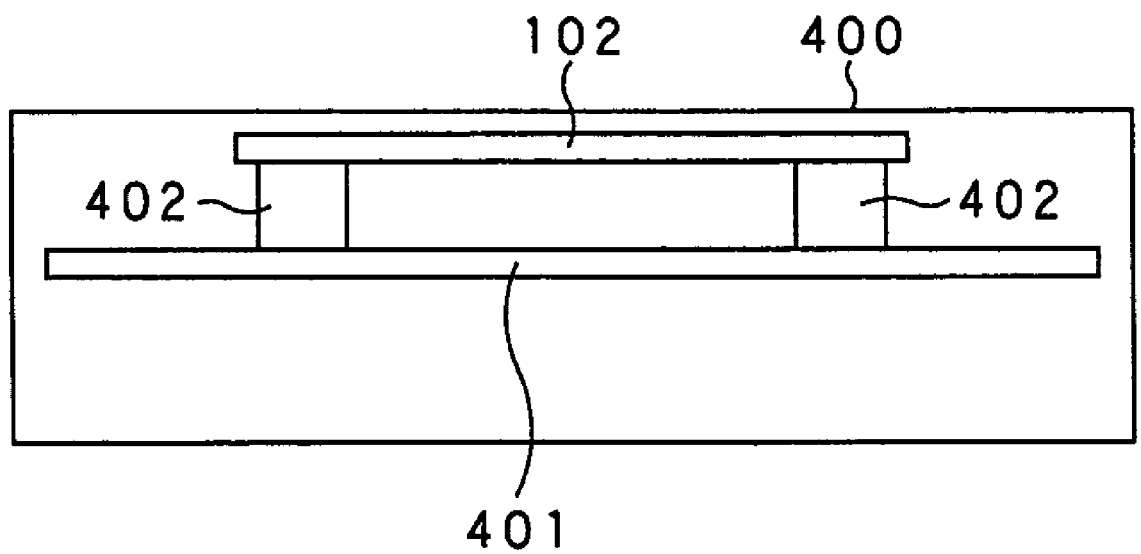
FIG. 6 is a side elevation of the conventional R/W loop antenna disposed in the resin-made housing.
Figure 9:
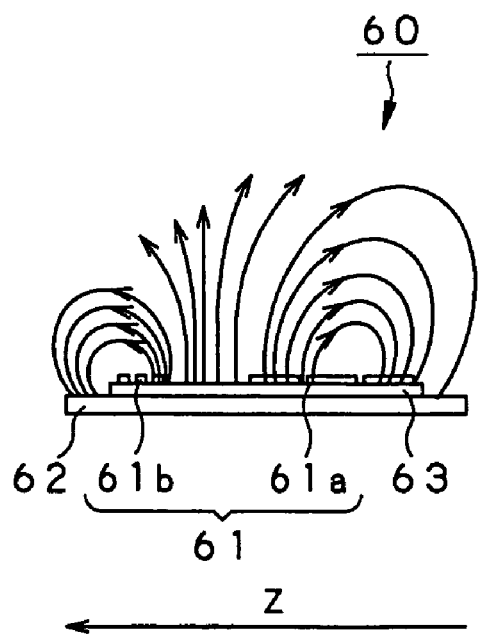
FIG. 9 schematically illustrates a Z-directional distribution of a magnetic field developed around the plane asymmetric loop antenna.

In this case, the distribution of a magnetic field around the antenna apparatus 60 in one direction indicated with the arrow Z in FIG. 8 is enhanced at the upper winding section 61a of the loop coil 61, larger in interval and width as shown in FIG. 9. That is, different from the magnetic field distribution being symmetric as shown in FIG. 3, the distribution of magnetic field around the antenna apparatus 60 is asymmetric.

In the antenna apparatus 60 according to the present invention, since the loop coil 61 is formed asymmetric and the distribution of a magnetic field radiated from the loop coil 61 is controlled, it is possible to provide a wider range of communications between the IC card 1 and R/W 50 and also shift the position of communication in one direction.

Also, since the loop coil 61 can be formed smaller than the loop coil 4 at the IC card 1, the antenna apparatus 60 can be formed further smaller.

The antenna apparatus 60 according to the present invention has the magnetic sheet 62 disposed to face the main side of the loop coil 61, opposite to the main side facing the IC card 1, and thus can enhance only the magnetic field distribution on the main side of the loop coil 61, facing the IC card 1. Therefore, since the magnetic field intensity is increased, the antenna apparatus 60 according to the present invention can provide a further increased range of communications between the IC card 1 and R/W 50.

Figure 10:
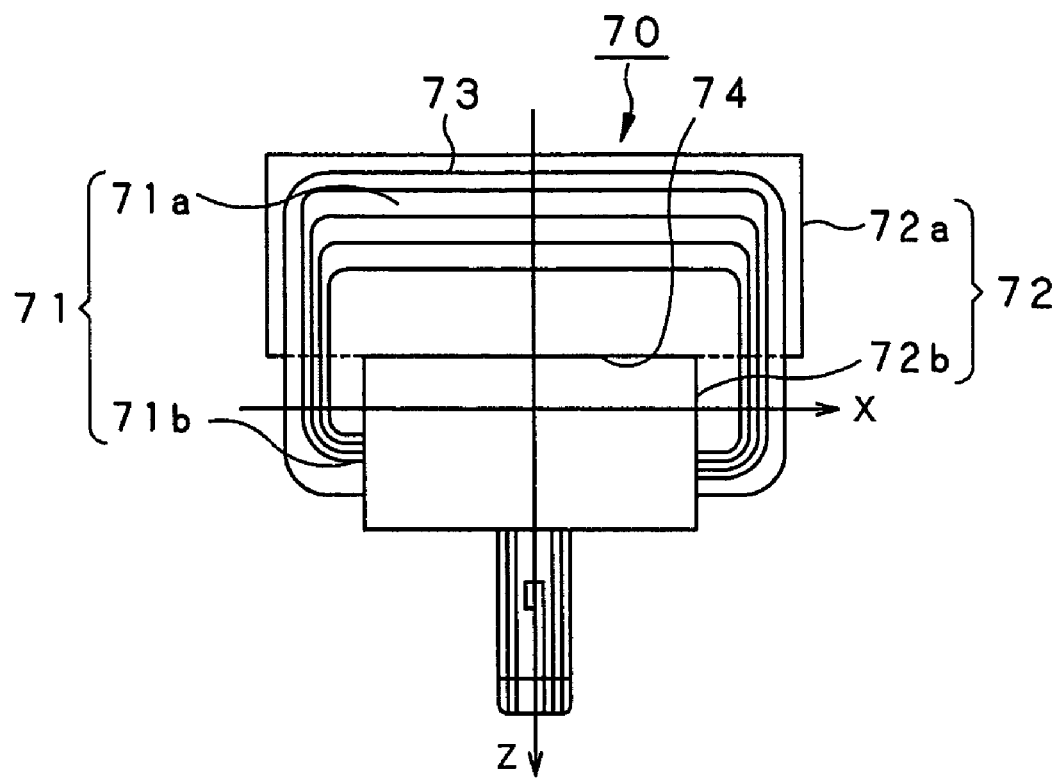
FIG. 10 is a plan view of a cubic asymmetric loop antenna.

The aforementioned loop antenna 54 provided at the R/W 50 may be an antenna apparatus constructed according to the present invention as shown in FIG. 10. The antenna apparatus is generally indicated with a reference 70.

As shown in FIG. 10, the antenna apparatus 70 includes a loop coil 71 for inductive coupling of an electromagnetic field, and a magnetic sheet 72 formed from magnetic sheet portions penetrated through the center of the loop coil 71 and lapped on each other.

The loop coil 71 is formed by etching or other processing of a conductive metal foil of electrolytic copper or the like formed on both sides of an insulation film or substrate 73 made of a flexible film of polyimide or mica. It should be noted that the method of forming the loop coil 71 is not limited to the above one but the loop coil 71 may be formed by printing an electroconductive paste such as a silver paste on the film or substrate 73 to form a conductor pattern that provides the loop coil 71 or by sputtering a metal target to form, on the substrate 73, a conductor pattern that provides the loop coil 71.

Also, in the loop coil 71, the winding sections thereof opposite to each other across the center of the loop coil 71 are disposed asymmetrically to be different in interval and width from each other in one direction. That is, the loop coil 71 includes an upper winding section 71*a* larger in interval and width in one direction, that is, a vertical direction indicated with an arrow Z in FIG. 10, and a lower winding section 71*b* smaller in interval and width in that direction Z. Also, the loop coil 71 has formed in the center thereof a through-hole 74 through which the magnetic sheet 72 is penetrated.

Figure 11:
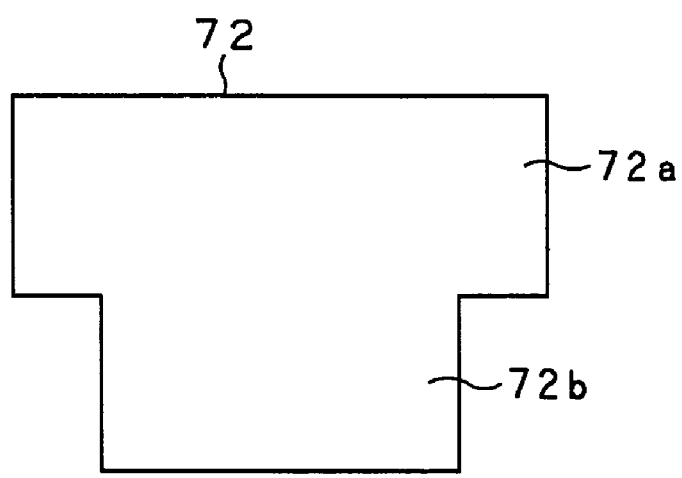
FIG. 11 is a plane view of a magnetic sheet of the cubic asymmetric loop antenna.

On the other hand, the magnetic sheet 72 includes a portion 72*a* extended in one direction of the loop coil 71 and wider than the outermost width of the winding section of the loop coil 71, and a portion 72*b* extended downward from the bottom center of the wide portion 72*a* and narrower than the innermost width of the winding section of the loop coil 71 as shown in FIGS. 10 and 11. Namely, the magnetic sheet 72 is formed generally like a letter "T". More specifically, the wide portion 72*a* of the magnetic sheet 72 is formed to have a rectangular shape larger than the loop coil 71 to cover the upper winding section 71*a* of the loop coil 71 completely within the main side thereof. On the other hand, the narrow portion 72*b* of the magnetic sheet 72 is formed to have a rectangular shape sufficiently wide to penetrate through the through-hole 74 in the loop coil 71 and smaller than the loop coil 71 for the lower winding section 71*b* of the loop coil 71 to be covered completely within the main side thereof.

In the antenna apparatus 70, the magnetic sheet 72 is attached to the loop coil 71 with the narrow portion 72*b* thereof being penetrated through the through-hole 74 in the loop coil 71 in a direction from the main side of the loop coil 71, opposite to the main side facing the IC card 1, toward the main side facing the IC card 1. Therefore, at the upper winding section of the loop coil 71 where the winding interval is large, the wide portion 72*a* of the magnetic sheet 72 faces, at one main side thereof, the main side of the loop coil 71, opposite to the main side facing the IC card 1. At the lower winding section of the loop coil 71 where the winding interval is small, the narrow portion 72*b* of the magnetic sheet 72 faces, at the other main side thereof, the main side, facing the IC card 1, of the loop coil 71.

Figure 12:
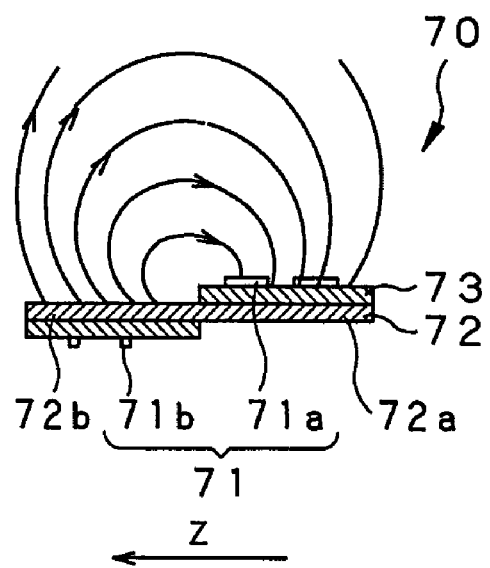
FIG. 12 schematically illustrates the Z-directional distribution of a magnetic field developed around the cubic asymmetric loop antenna.

In this case, the distribution of a magnetic field around the antenna apparatus 70 in one direction, namely, a vertical direction indicated with the arrow Z in FIG. 10, is asymmetric and enhanced at the upper winding section 71*a* of the loop coil 71 where the winding interval and width are large, as shown in FIG. 12.

In the antenna apparatus 70 according to the present invention, since the loop coil 71 is formed asymmetric and the distribution of a magnetic field radiated from the loop coil 71 is controlled, it is possible to provide a wider range of communications between the IC card 1 and R/W 50 and also shift the position of communication in one direction. Also, since the loop coil 71 can be formed smaller in size than the loop coil 4 at the IC card 1, the antenna apparatus 70 can be formed further smaller.

At the upper portion of the antenna apparatus 70 where the winding interval of the loop coil 71 is large, the wide portion 72*a* of the magnetic sheet 72 faces the main side of the loop coil 71, facing the IC card 1. Also, at the lower portion where the winding interval of the loop coil 71 is small, the narrow portion 72*b* of the magnetic sheet 72 faces the main side of the loop coil 71, facing the IC card 1. Thus, it is possible to enhance only the magnetic field distribution around the upper winding section 71*a* on the main side facing the IC card 1, of the loop coil 71 where the winding interval and width of the loop coil 71 are large.

Therefore, since the magnetic field strength in the upper portion of the antenna apparatus 70 where the winding interval and width of the loop coil 71 are larger is enhanced, it is possible to provide a largely widened range of communications between the IC card 1 and R/W 50 in one place.

Figure 13:
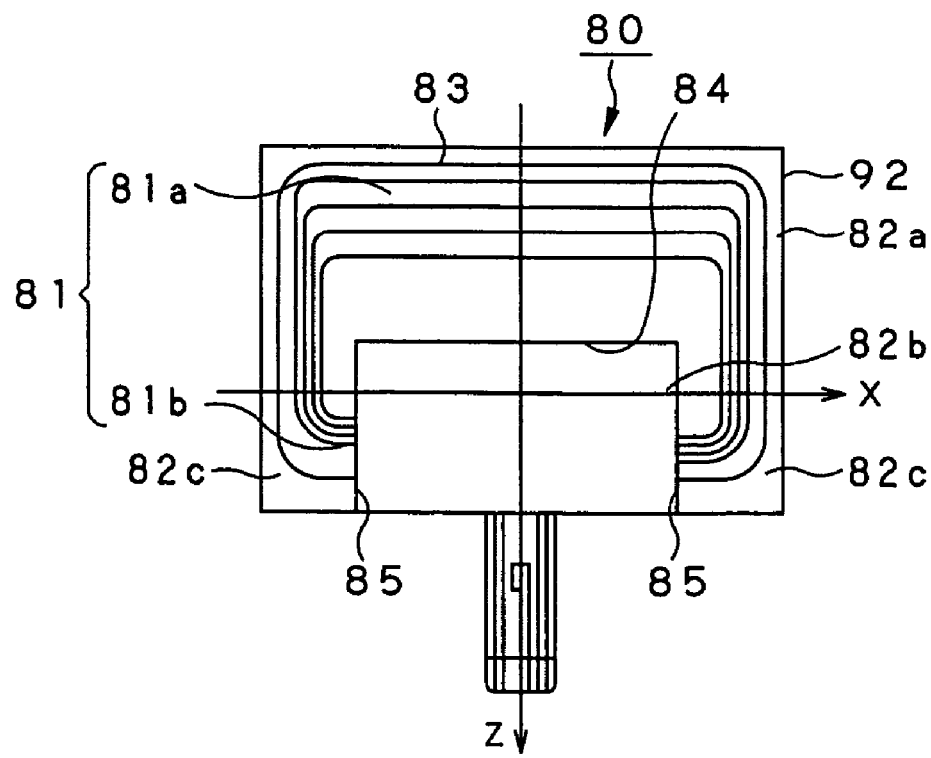
FIG. 13 is a plan view of a variant of the cubic asymmetric loop antenna.

The aforementioned loop antenna 54 provided at the R/W 50 may be an antenna apparatus constructed according to the present invention as shown in FIG. 13. This antenna apparatus is generally indicated with a reference 80.

As shown in FIG. 13, the antenna apparatus 80 includes a loop coil 81 for inductive coupling of an electromagnetic field, and a magnetic sheet 82 formed from magnetic sheet portions penetrated through the center of the loop coil 81 and lapped on each other.

The loop coil 81 is formed by etching or other processing of an electroconductive metal foil of electrolytic copper or the like formed on both sides of an insulation film or substrate 83 made of a flexible film of polyimide or mica. It should be noted that the method of forming the loop coil 81 is not limited to the above one but the loop coil 81 may be formed by printing an electroconductive paste such as a silver paste on the film or substrate 83 to form a conductor pattern that provides the loop coil 81 or by sputtering a metal target, on the substrate 83, to form a conductor pattern that provides the loop coil 81.

Also, in the loop coil 81, the winding sections thereof opposite to each other across the center of the loop coil 81 are disposed asymmetrically to be different in interval and width from each other in one direction. That is, the loop coil 81 includes an upper winding section 81*a* larger in interval and width in one direction, that is, a vertical direction indicated with an arrow Z in FIG. 13, and a lower winding section 81*b* smaller in interval and width in that direction of arrow Z. Also, the loop coil 81 has formed in the center thereof a through-hole 84 through which the magnetic sheet 82 is penetrated.

Figure 14:
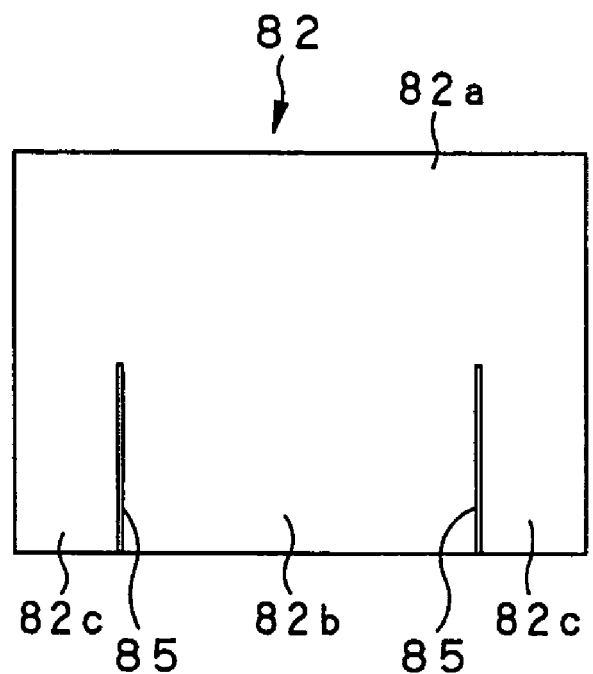
FIG. 14 is a plan view of the magnetic sheet included in the cubic asymmetric loop antenna shown in FIG. 13.

On the other hand, the magnetic sheet 82 is formed to have a rectangular shape larger than the loop coil 81 to cover the latter completely within the main side thereof as shown in FIGS. 13 and 14. The magnetic sheet 82 has a pair of slits or cuts 85 formed at predetermined intervals and parallel to each other. The cuts 85 extend from the lower end of the magnetic sheet 82 to the middle of the loop coil 81 in one direction. Thus, the magnetic sheet 82 includes a portion 82*a* wider than the outermost width of the winding section of the loop coil 81, and a portion 82*b* positioned between the pair of cuts 85 to extend downward from the bottom center of the wide portion 82*a* and narrower than the innermost width of the winding section of the loop coil 81, and a pair of edge portions 82*c* positioned across the narrow portion 82*b* between the pair of cuts 85 and extended downward from the lower end of the wide portion 82*a*. In this the magnetic sheet 82, the wide portion 82*a* is formed to have a rectangular shape larger than the loop coil 81 to cover the upper winding section 81*a* of the loop coil 81 completely within the main side thereof. On the other hand, the narrow portion 82*b* of the magnetic sheet 82 is formed to have a rectangular shape sufficiently wide to penetrate through the through-hole 84 in the loop coil 81 and smaller than the loop coil 81 for the central portion of the lower winding section 81*b* of the loop coil 81 to be covered completely within the main side thereof. The pair of edge portions 82*c* is formed to have a rectangular shape to cover the lateral portion of the lower winding section 81*b* of the loop coil 81 completely within the main side thereof.

In the antenna apparatus 80 shown in FIG. 13, the magnetic sheet 82 is attached to the loop coil 81 with the narrow portion 82*b* thereof being penetrated through the through-hole 84 in the loop coil 81 to extend from the main side of the loop coil 81, opposite to the main side facing the IC card 1, toward the main side facing the IC card 1. Therefore, at the upper portion of the antenna apparatus 80 where the winding interval of the loop coil 81 is large, the main side of the wide portion 82*a* of the magnetic sheet 82 is disposed to face the main side of the loop coil 81, opposite to the main side facing the IC card 1. At the lower portion where the winding interval of the loop coil 81 is small, the main side of the narrow portion 82*b* of the magnetic sheet 82 faces the main side of the loop coil 81, opposite to the main side facing the IC card 1. One main side of the pair of edge portions 82*c* faces the main side of the loop coil 81, facing the IC card 1.

Figure 15:
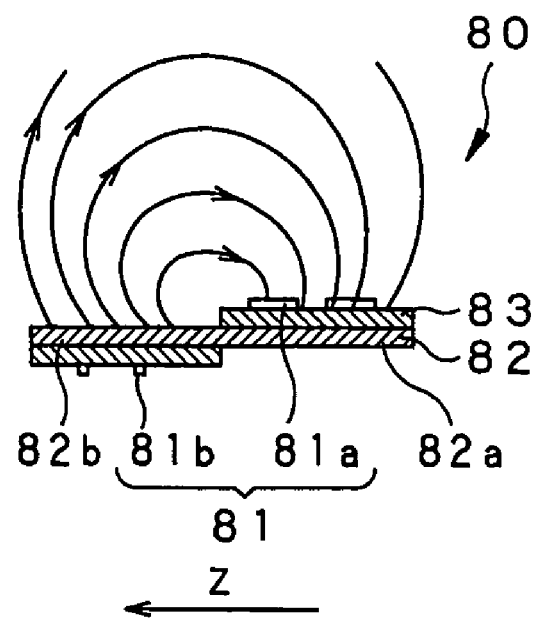
FIG. 15 schematically illustrates a Z-directional distribution of a magnetic field developed around the cubic asymmetric loop antenna shown in FIG. 13.

In this case, the distribution of a magnetic field around the antenna apparatus 80 in one direction, namely, a vertical direction indicated with the arrow Z in FIG. 13, is asymmetric and enhanced at the upper winding section 81*a* of the loop coil 81 where the winding interval and width are large as shown in FIG. 15.

In the antenna apparatus 80 shown in FIG. 13, since the loop coil 81 is formed asymmetric and the distribution of a magnetic field radiated from the loop coil 81 is controlled, it is possible to provide a wider range of communications between the IC card 1 and R/W 50 and also shift the position of communication in one direction. Also, since the loop coil 81 can be formed smaller than the loop coil 4 at the IC card 1, the antenna apparatus 80 can be formed further smaller.

At the upper portion of the antenna apparatus 80 where the winding interval of the loop coil 81 is large, the wide portion 82*a* of the magnetic sheet 82 faces the main side of the loop coil 81, opposite to the main side facing the IC card 1. Also, at the lower portion where the winding interval of the loop coil 81 is small, the narrow portion 82*b* of the magnetic sheet 82 faces the main side of the loop coil 81, facing the IC card 1. Thus, it is possible to enhance only the magnetic field distribution around the upper winding section 81*a* on the main side facing the IC card 1, of the loop coil 81 where the winding interval and width of the loop coil 81 are large.

Therefore, since the magnetic field strength in the upper portion of the antenna apparatus 80 where the winding interval and width of the loop coil 81 are larger is enhanced, it is possible to largely widen the range of communications between the IC card 1 and R/W 50 in one place.

Further, at the lateral portion of the lower winding section 81*b* of the loop coil 81 in the antenna apparatus 80, the pair of edge portions 82*c* in the magnetic sheet 82 are disposed to face the main side of the loop coil 81, opposite to the main side facing the IC card 1. Thus, it is possible to enhance the magnetic field distribution at the lateral portion of the loop coil 81 on the main side of the loop coil 81, facing the IC card 1, that is, the magnetic field distribution in the direction of arrow X perpendicular to the direction of arrow Z in FIG. 13.

Figure 16:
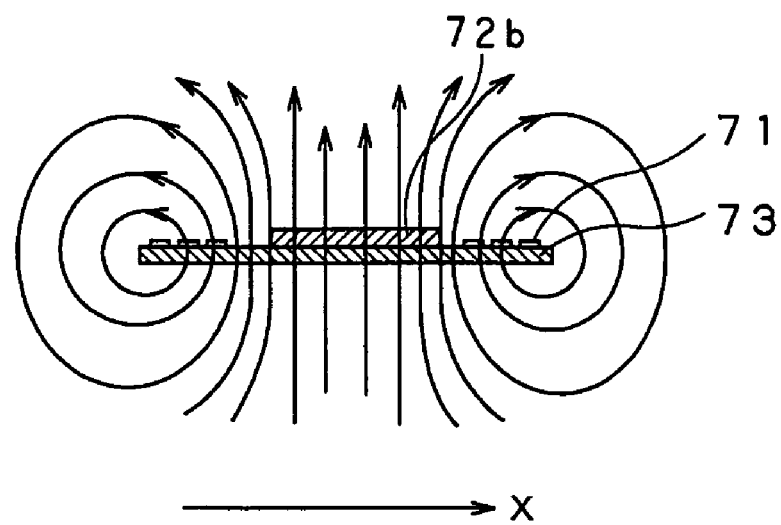
FIG. 16 schematically illustrates an X-directional distribution of a magnetic field developed around the cubic asymmetric loop antenna shown in FIG. 13.
Figure 17:
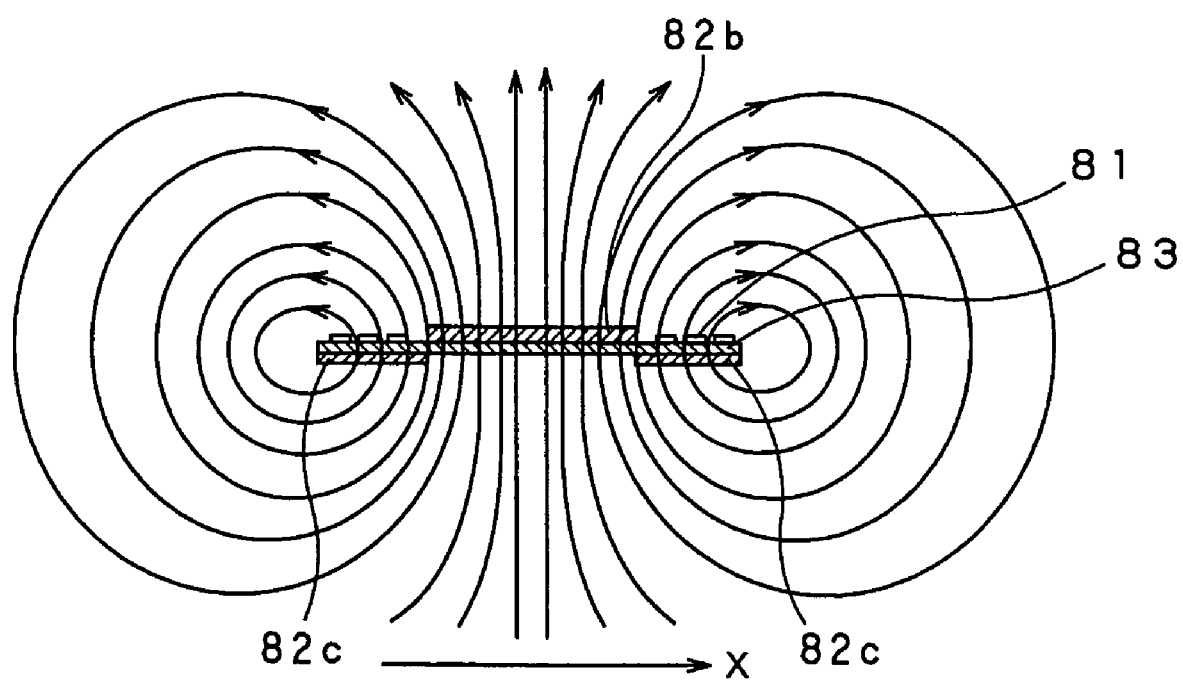
FIG. 17 schematically illustrates an X-directional distribution of a magnetic field developed around the cubic asymmetric loop antenna shown in FIG. 13.

Note here that in the aforementioned antenna apparatus 70 shown in FIG. 10, the magnetic field distribution in the direction of arrow X will be enhanced by the wide portion 72*a* of the magnetic sheet 72, larger than the coil loop 71 as shown in FIG. 16. On the other hand, in the antenna apparatus 80 shown in FIG. 13, the magnetic field distribution in the direction of arrow X will be enhanced by the wide portion 82*a* of the magnetic sheet 82, larger than the loop coil 81, and also by the lateral portion of the loop coil 81 since the pair of edge portions 82*c* of the magnetic sheet 82 is disposed to face the lateral portion of the lower winding section 81*b* of the loop coil 81, as shown in FIG. 17.

Therefore, in the antenna apparatus 80 shown in FIG. 13, the enhancement of the magnetic field strength at the lateral portion of the loop coil 81 permits to provide a wider range of communications between the IC card 1 and R/W 50 more largely than in the antenna apparatus 70 shown in FIG. 10 in a direction perpendicular to the one direction.

Note here that in the aforementioned antenna apparatuses 60, 70 and 80 according to the present invention, the range of communications between the IC card 1 and R/W 50 can be widened by selecting, for the magnetic sheets 62, 72 and 82, an effective specific permeability $\mu'$ of 30 or more with a carrier frequency in the direction of the surface of the magnetic sheet and a product $Ms \cdot t$ of saturation magnetization Ms and thickness t of 6 emu/cm$^2$ or more.

Figure 18:
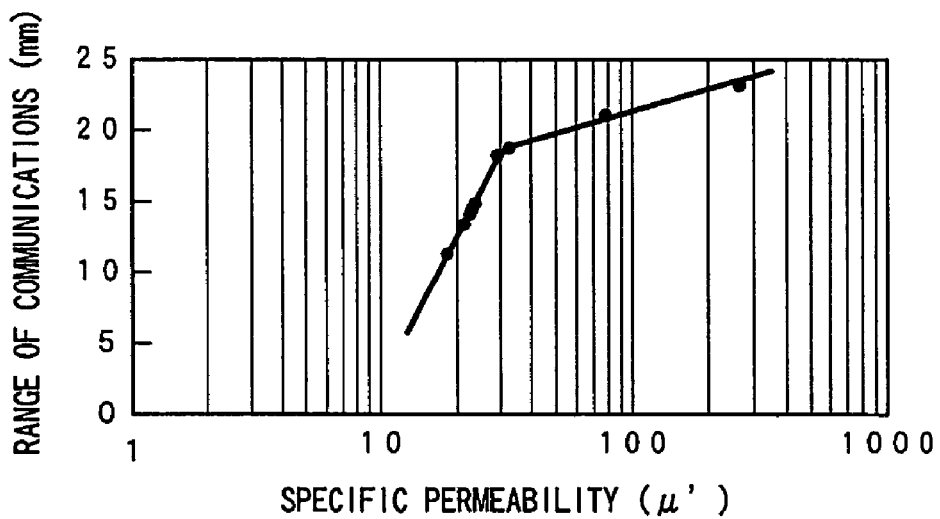
FIG. 18 shows a characteristic curve showing the relation between the specific permeability of the magnetic sheet and range of communications.

For selection of the above specific permeability $\mu'$ and product $Ms \cdot t$ of saturation magnetization Ms and thickness t, the relation between the effective specific permeability $\mu'$ of the magnetic sheets 62, 72 and 82 and the range of communications was examined with the carrier frequency. The examination results are shown in FIG. 18. As will be known from the characteristic curve in FIG. 18, the specific permeability $\mu'$ of the magnetic sheets 62, 72 and 82 should preferably be 30 or more to provide a wider range of communications of the antenna apparatuses 60, 70 and 80, and more preferably be 50 or more to further widen the range of communications between the IC card 1 and R/W 50.

Figure 19:
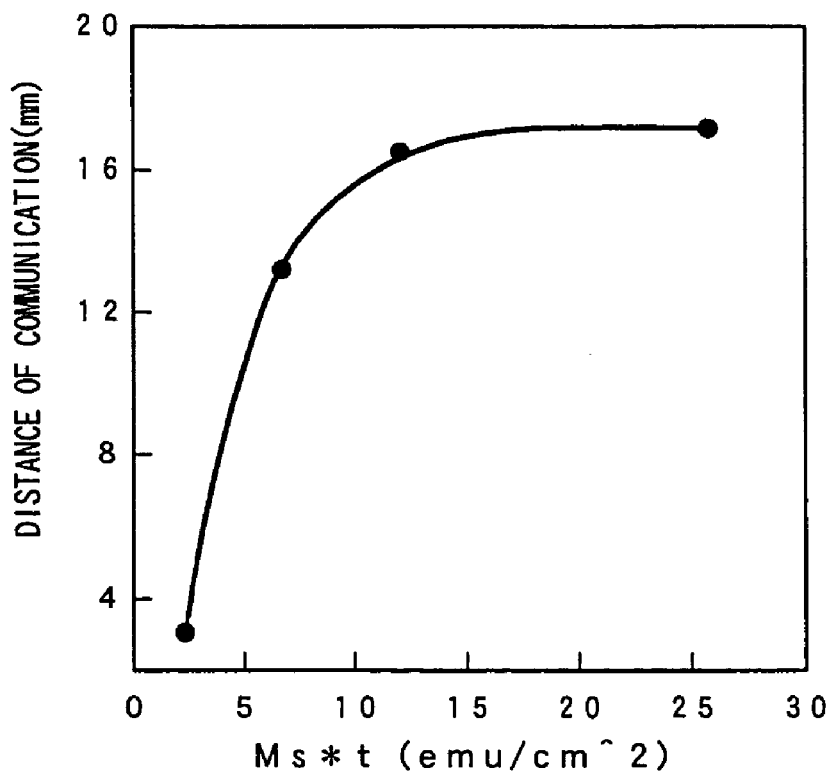
FIG. 19 shows a characteristic curve showing the relation between the product Ms·t of saturation magnetization Ms and thickness t and distance of communication.

Also, the relation between the product $Ms \cdot t$ of saturation magnetization Ms and thickness t of the magnetic sheets 62, 72 and 82 and the distance of communication was examined. The examination results are shown in FIG. 19. As will be known from the characteristic curve in FIG. 19, the product $Ms \cdot t$ of saturation magnetization Ms and thickness t of the magnetic sheets 62, 72 and 82 should preferably be 6 emu/cm$^2$ or more to increase the distance of communication of the antenna apparatuses 60, 70 and 80, and more preferably be 10 emu/cm$^2$ or more to further increase the range of communications.

The magnetic sheets 62, 72 and 82 should have a coercive force Hc of 100 e or less.

Note here that for the measurement of the specific permeability μ', an annular sample of 7 mm in diameter was prepared, a conductive coil was wound five turns on the sample, AC specific permeability was measured and quantized by a vector impedance analyzer using a carrier frequency of 13.56 MHz and that the saturation magnetization Ms was measured using the ordinary vibration sample method (VSM).

The magnetic sheets 62, 72 and 82 used in the antenna apparatuses 60, 70 and 80, respectively, according to the present invention may be any ones formed from any soft magnetic material by any arbitrary method if only they would meet the magnetic characteristics of the antenna apparatuses 60, 70 and 80. For example, the magnetic material may be selected from an amorphous alloy, Co—Cr alloy, Fe—Al alloy, Sendust alloy (Fe—Al—Si), Fe—Ni alloy, Fe—Co—Ni alloy, etc. The magnetic sheet may be any one of a sheet formed by powdering any one of these materials, mixing or dispersing a rubber binder into the fine powder of the material or coating the rubber binder to a sheet formed from the powder, a soft magnetic laminate formed by plating or sputtering the material, a bulk laminate formed from a sintered compact of a ferrite powder and not containing any binder, and the like.

As having been described above, the antenna apparatuses 60, 70 and 80 according to the present invention is characterized in that the specific permeability μ', and the product Ms·t of saturation magnetization Ms and thickness t, of the magnetic sheets 62, 72 and 82 are set in accordance with a necessary range of communications. By optimizing the specific permeability μ', and the product Ms·t of saturation magnetization Ms and thickness t, of the magnetic sheets 62, 72 and 82, it is possible to provide a wider range of communications between the IC card 1 and R/W 50.

In the antenna apparatuses 60, 70 and 80 according to the present invention, since the loop coils 61, 71 and 81 can be formed smaller in size than the loop coil 4 at the IC card 1 by improving the performance of communications, the entire apparatus can be reduced in thickness to less than 1 mm for example and can thus be formed smaller and thinner.

Note that in the antenna apparatuses 60, 70 and 80 according to the present invention, the upper and lower winding sections of the aforementioned loop coils 61, 71 and 81 may not always be different in both interval and width from each other but may be different in interval alone. Also, the loop coils 61, 71 and 81 may be formed asymmetric in any arbitrary direction in which the distribution of radiated magnetic field should be widened. For example, in the loop coils 61, 71 and 81, the upper and lower winding sections thereof opposite to each other across the center of each loop coil may be formed asymmetric to be different in interval and width from each other in the direction of arrow X perpendicular to the aforementioned direction of arrow Z or in both these directions of arrows Z and X.

Thus, it is possible to control the distribution of radiated magnetic field around the loop coils 61, 71 and 81 and also arbitrarily adjust the position of the R/W 50 for read from or write to the IC card 1, in a direction or directions in which the loop coils 61, 71 and 81 in the antenna apparatuses 60, 70 and 80 according to the present invention are formed asymmetric.

Figure 1:
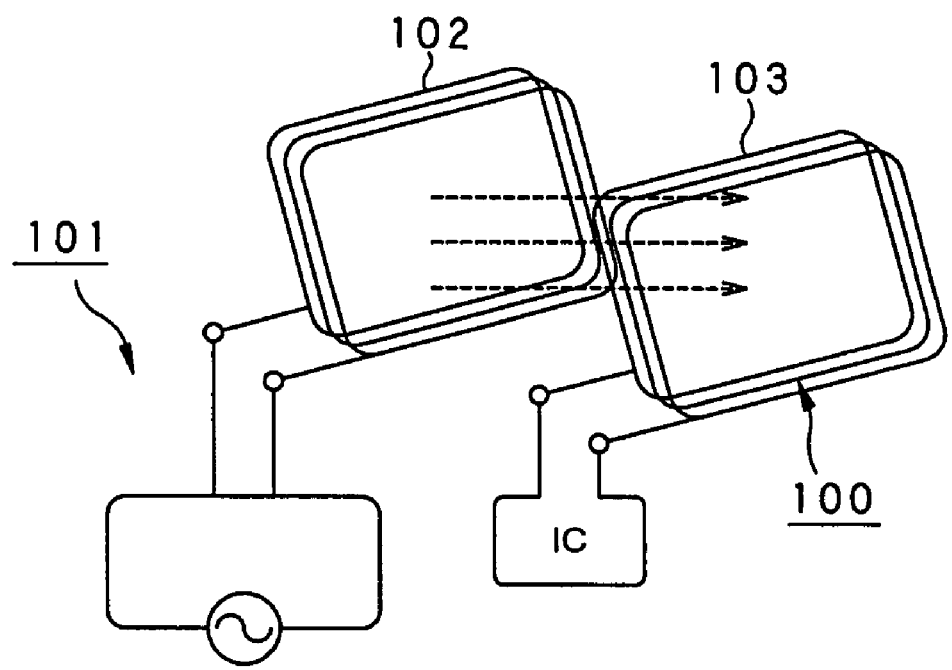
FIG. 1 is a perspective view of the conventional RFID system.
Figure 2:
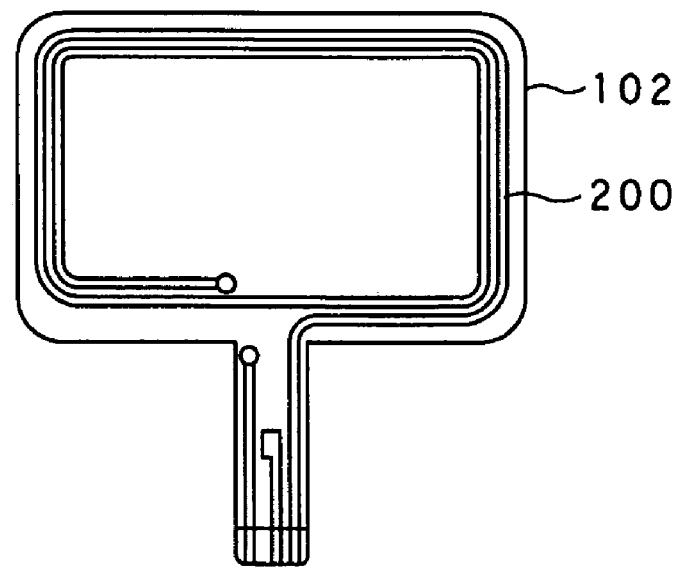
FIG. 2 is a plan view of the conventional R/W (reader/writer) loop antenna.
Figure 20:
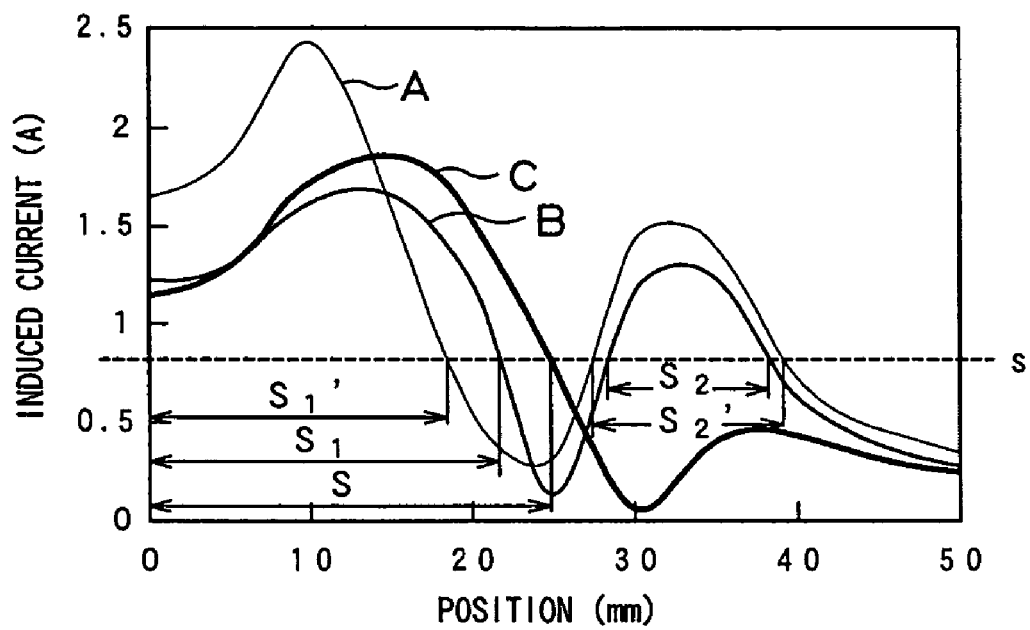
FIG. 20 shows an induced current characteristic curve showing the performance of communications between the IC card and each of the plane symmetric loop antenna, plane asymmetric loop antenna and cubic asymmetric loop antenna, each disposed in a resin-made housing.
Figure 21:
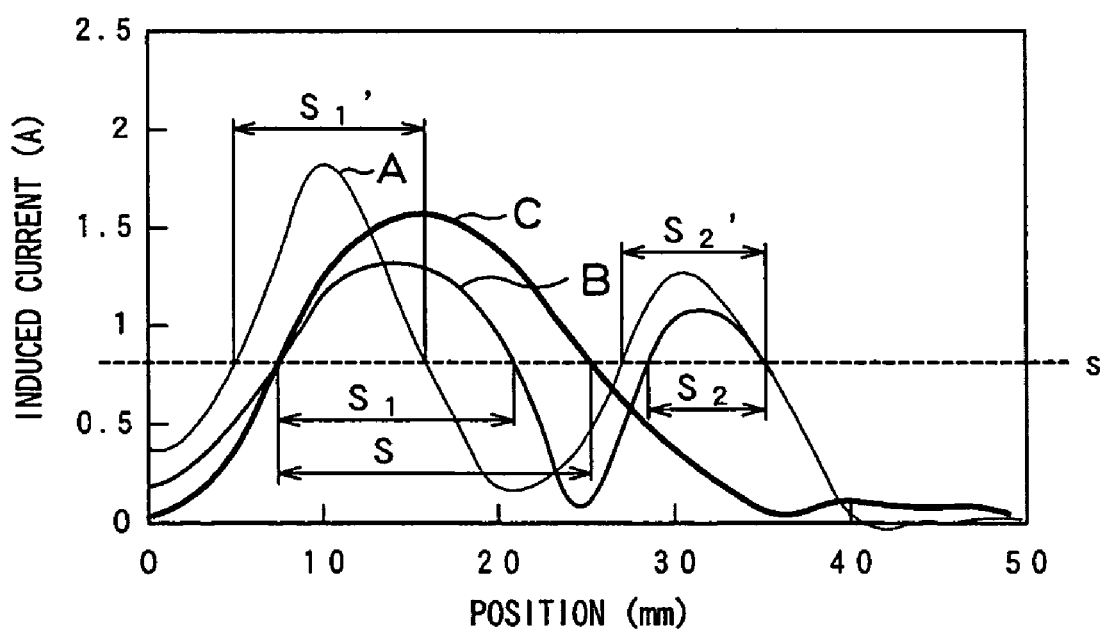
FIG. 21 shows an induced current characteristic curve showing the performance of communications between the IC card and each of the plane symmetric loop antenna, plane asymmetric loop antenna and cubic asymmetric loop antenna, each disposed in a metallic housing.

For comparison in performance of communications among the antenna apparatus 60 constructed as shown in FIG. 8 according to the present invention (will be referred to as "plane asymmetric loop antenna" hereunder), antenna apparatus 70 constructed according to the present invention as shown in FIG. 10 (will be referred to as "cubic asymmetric loop antenna" hereunder) and the conventional antenna apparatus 200 constructed as shown in FIG. 2 (will be referred to as "plane symmetric loop antenna" hereunder; with the magnetic sheet being disposed to face the main side of the loop coil, opposite to the main side facing the IC card 1), each of them was placed in a resin housing as shown in FIG. 20 and also in a metallic housing as shown in FIG. 21. The results of comparison will be described herebelow.

Note that FIGS. 20 and 21 show characteristic curves, respectively, showing the dependence on the card position of the strength of a current induced to the IC card by each of the loop antennas 60, 70 and 200 at the R/W and in which the origin "0" on the horizontal axis indicates the center of each of the loop antennas 60, 70 and 200 at the R/W and the positive-going direction indicates a direction in which the IC card position is shifted outwardly from the origin "0". On the other hand, the vertical axis indicates the strength of a current electromagnetically developed on the loop antenna at the IC card by the magnetic field around each of the loop antennas 60, 70 and 200 at the R/W and communications are possible in an area above a value indicated with a dashed line s in FIGS. 20 and 21. In FIGS. 20 and 21, a thin line A indicates a characteristic of the plane symmetric loop antenna 200, a thicker line B indicates a characteristic of the plane asymmetric loop antenna 60 and a thickest line C indicates a characteristic of the cubic asymmetric loop antenna 70.

Each of the loop antennas 60, 70 and 200 was placed in the resin housing shown in FIG. 20. The conventional plane symmetric loop antenna 200 had formed thereon two communication areas S$_1$' and S$_2$' which are narrow as will be seen in FIG. 20. In the plane asymmetric loop antenna 60 according to the present invention, two communication areas S$_1$ and S$_2$ were also formed but the communication area S$_1$ was largely widened in range of communications. The cubic asymmetric loop antenna 70 according to the present invention had a communication area S formed only in one place near the center thereof and which is widest in comparison with those in the other loop antennas. The communication area S was only formed in one place because the cubic asymmetric structure of the loop antenna 70 forms only one radiated magnetic field as in the magnetic field distribution shown in FIG. 12. FIG. 9 shows asymmetric bidirectionally radiated magnetic fields.

In case each of the loop antennas 60, 70 and 200 was placed in the metallic housing shown in FIG. 21, the range of communications was found narrower under the influence of the metallic housing in all the loop antennas 60, 70 and 200 than that when the loop antenna was placed in the resin housing shown in FIG. 20. In the plane asymmetric loop antenna 60 and cubic asymmetric loop antenna 70 according to the present invention, however, the induced current was reduced less than in the conventional plane symmetric loop antenna 200. Namely, in the loop antennas 60 and 70 according to the present invention, the induced current was found less influenced by the material of the housing than in the conventional loop antenna 200.

As will be known from the above, the plane asymmetric loop antenna 60 and cubic asymmetric loop antenna 70 according to the present invention can have the performance of communication thereof improved as the communication areas $S_1$ and $S_2$ are continuously wider outwardly from the origin "0". Especially the cubic asymmetric loop antenna 70 can conveniently be used since the communication area $S_1$ can be largely widened in one place, and have the impedance thereof lowered than that in the plane asymmetric loop antenna 60, which is advantageously dedicated to a reduced power consumption.

The above plane asymmetric loop antenna 60 and cubic asymmetric loop antenna 70 can be less influenced by the material of the housing for them, and thus they can have the range of communications thereof widened in comparison with the conventional plane symmetric loop antenna 200.

Also, for comparison in performance of communications among the aforementioned loop antennas 60, 70 and 200, they were tested with and without the magnetic sheet disposed to face the main side thereof opposite to the main side facing the IC card. The test results with the magnetic sheet being so disposed are shown in FIG. 22, and those with no magnetic sheet being disposed so are shown in FIG. 23.

Figure 22:
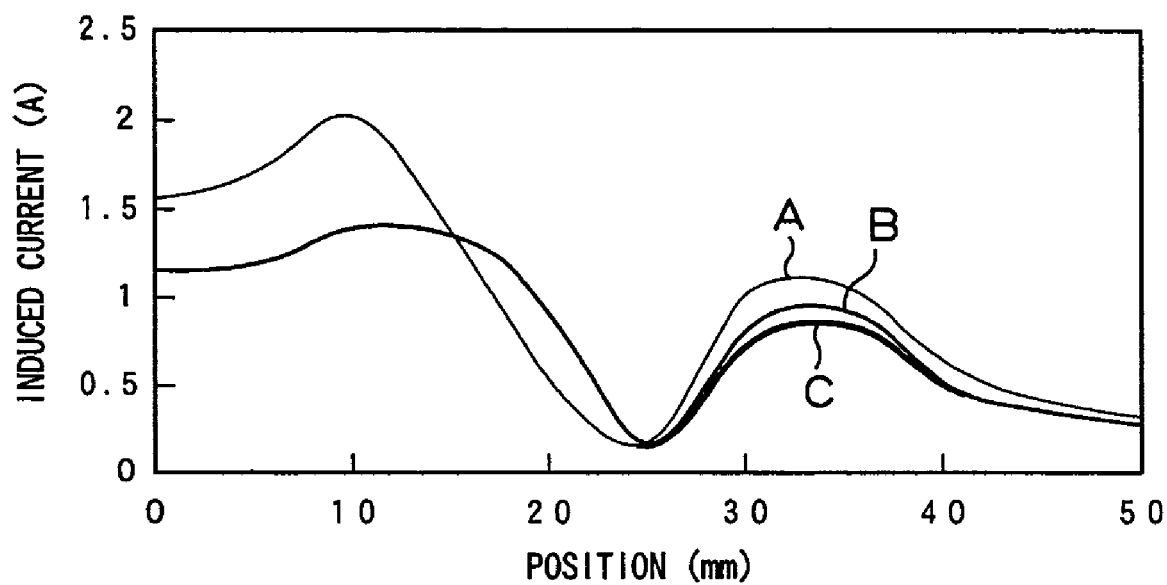
FIG. 22 shows an induced current characteristic curve showing the performance of communications between the IC card and each of the plane symmetric loop antenna, plane asymmetric loop antenna and cubic asymmetric loop antenna, each with no magnetic sheet disposed in combination therewith.
Figure 23:
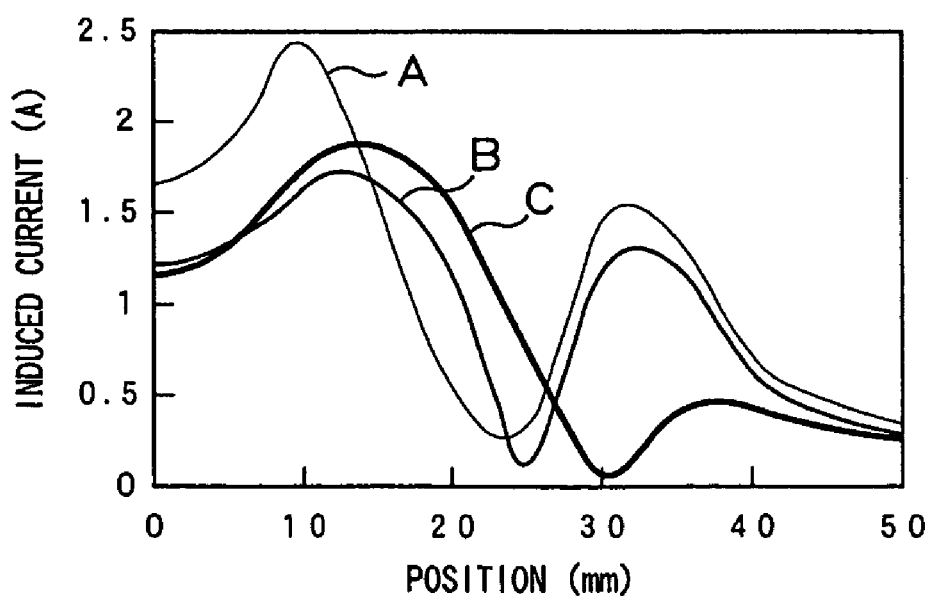
FIG. 23 shows an induced current characteristic curve showing the performance of communications between the IC card and each of the plane symmetric loop antenna, plane asymmetric loop antenna and cubic asymmetric loop antenna, each with a magnetic sheet disposed in combination therewith.

Note that FIGS. 22 and 23 show characteristic curves, respectively, showing the dependence on the card position of the strength of a current induced to the IC card by each of the loop antennas 60, 70 and 200 at the R/W and in which the origin "0" on the horizontal axis indicates the center of each of the loop antennas 60, 70 and 200 at the R/W and the positive-going direction indicates a direction in which the IC card position is shifted outwardly from the origin "0". On the other hand, the vertical axis indicates the strength of a current electromagnetically developed on the loop antenna at the IC card by the magnetic field around each of the loop antennas 60, 70 and 200 at the R/W. It should be noted that in FIGS. 22 and 23, a thin line A indicates a characteristic of the plane symmetric loop antenna 200, a thicker line B indicates a characteristic of the plane asymmetric loop antenna 60 and a thickest line C indicates a characteristic of the cubic asymmetric loop antenna 70.

As will be known from FIGS. 22 and 23, in all of the conventional loop antenna 200 and loop antennas 60 and 70 according to the present invention, the magnetic sheet disposed as above can have a stronger magnetic field, and consequently a stronger induced current, than in case no such magnetic sheet is disposed as above. Thus, the disposition of the magnetic sheet to face the main side of the loop antenna, opposite to the main side facing the IC card increases the magnetic field strength, and hence the strength of a current induced in the loop antenna at the IC card, and thus will be very advantageous in widening the range of communications of the R/W and reducing the power consumption.

Figure 24:
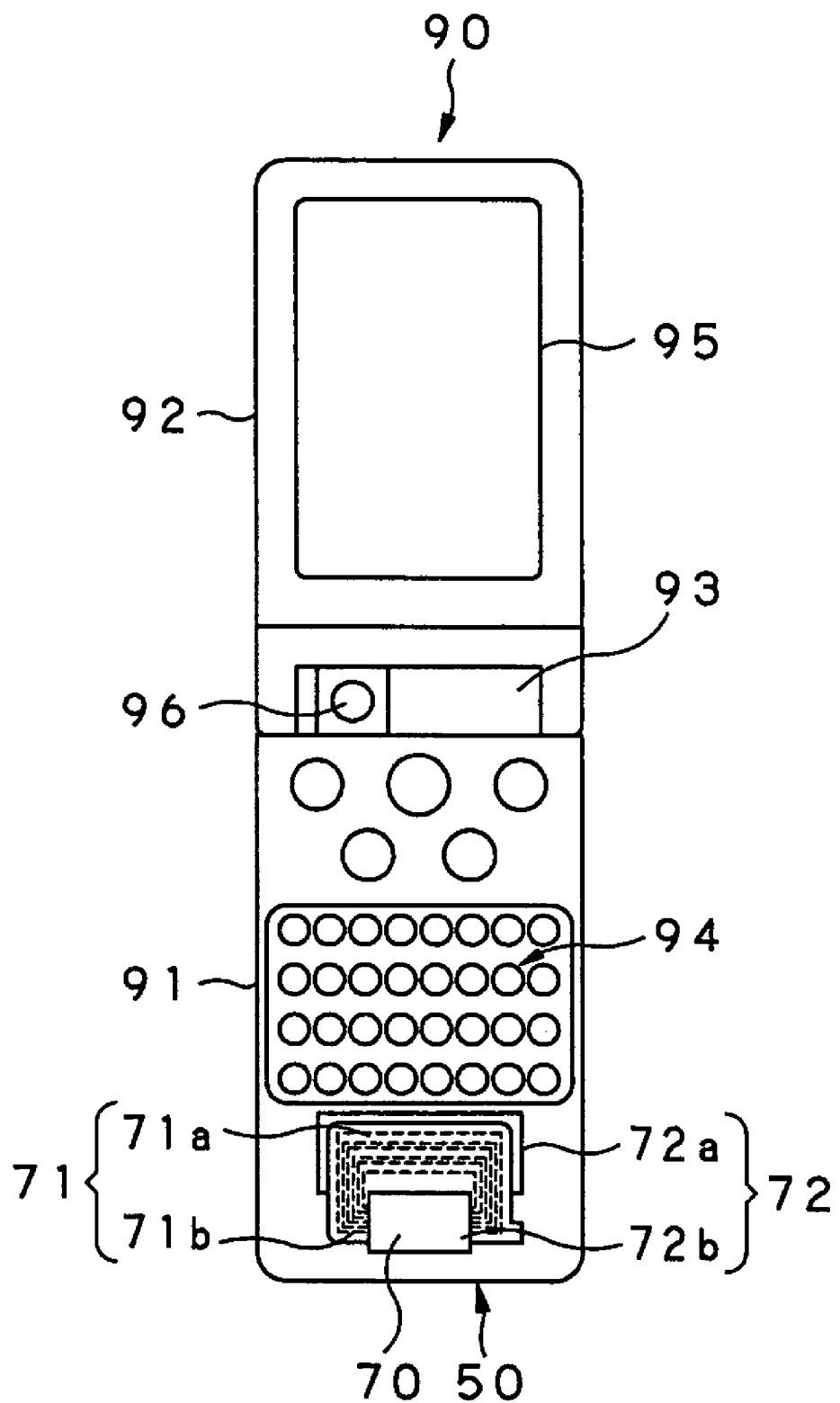
FIG. 24 is a plan view of a communication terminal device according to the present invention.

FIG. 24 shows a communication terminal device, generally indicated with a reference 90, as an example in which the aforementioned RFID system is applied. The present invention will be described herebelow concerning this communication terminal device 90. The communication terminal device 90 uses the aforementioned cubic asymmetric loop antenna 70 as the loop antenna 54 for the R/W 50.

The communication terminal device 90 according to the present invention is a small electronic device the user can carry such as a so-called PDA (portable digital assistant), for example. The small electronic device has functions such as information communication, storage, imaging, etc., for example, integrated in one module.

As shown, the communication terminal device 90 includes a body block 91, display panel block 92 and a hinge mechanism 93 that permits the display panel 92 to be opened from and closed to the body block 91. The body block 91 has provided thereon an input block 94 having operation buttons etc. for various operations of the communication terminal device 90, and below the input block 94 the aforementioned cubic asymmetric loop antenna 70 for the R/W 50.

The body block 91 has built therein a microcomputer (CPU) to control each of the components of the communication terminal device 90. The display panel block 92 has provided thereon a display unit 95 formed from a liquid crystal display (LCD) panel to display a user-made operation of the input block 94, data read from the IC card 1 by the R/W 50, etc. under the control of the CPU. The hinge mechanism 93 has a CCD camera 96 installed thereon. By operating the input block 94, an image captured by the CCD camera 96 can be displayed on the display unit 95.

Figure 25:
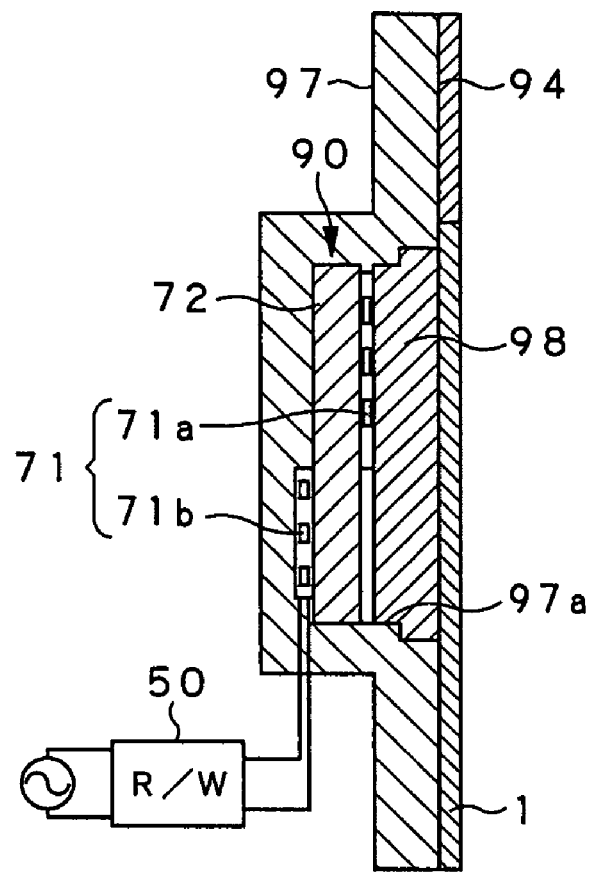
FIG. 25 is a sectional view of the cubic asymmetric loop antenna disposed in the communication terminal device.

To assure a sufficient rigidity of the communication terminal device 90 according to the present invention when it is formed small, lightweight and thin, the communication terminal device 90 has a metallic housing 97 formed from a metal such as Mg alloy or the like, as shown in FIG. 25. The metallic housing 97 has formed therein a concavity 97a for lodging therein the aforementioned cubic asymmetric loop antenna 70 and that is closed by a resin member 98 formed from carbonate or the like to protect the antenna 70. It should be noted that the housing in consideration is not limited to the metallic one 97 but may be a non-metallic one formed from a high-rigidity plastic or the like for example.

Also, the loop coil 71 of the cubic asymmetric loop antenna 70 is disposed in the aforementioned one direction thereof in which the IC card 1 is scanned. Thus, the IC card 1 will be scanned starting at the side thereof opposite to the input block 94 of the communication terminal device 90, that is, at the lower winding section of the loop coil 71 of the loop antenna 70 where the winding interval and width are smaller.

Figure 26:
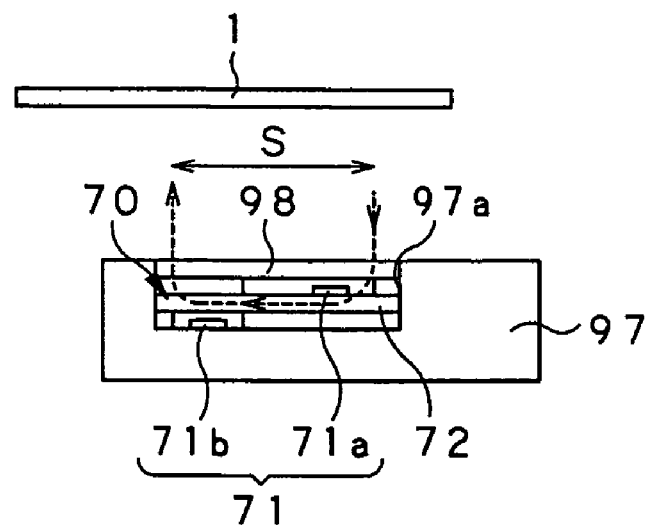
FIG. 26 schematically illustrates a distribution of magnetic field developed around the cubic asymmetric loop antenna disposed in the communication terminal device.

In this case, the magnetic field distribution around the cubic asymmetric loop antenna 70 is enhanced in the upper winding section 71a of the loop coil 71 where the winding interval and width are larger, and thus the strength of the magnetic field in the upper winding section 71a is increased, as shown in FIG. 26, so that the range S of communications between the IC card 1 and R/W 50 can be largely widened in one place.

Therefore, in the communication terminal device 90 according to the present invention, the range of communications between the IC card 1 and R/W 50 can be widened, and even when the IC card 1 is scanned starting at the side thereof opposite to the input block 94, data can appropriately be written to or read from the IC card 1 independently of the limited location of the cubic asymmetric loop antenna 70.

Even in case the communication terminal device 90 is placed in the metallic housing 97, disposition of the cubic asymmetric loop antenna 70 permits to inhibit the range of communications between the IC card 1 and R/W 50 from being decreased.

Further, since the loop antenna 70 at the R/W 50 can be formed smaller than the loop antenna 2 at the IC card 1, the communication terminal device 90 according to the present invention itself can be formed to be smaller and consume less power.

Next, an example of the method for manufacturing the aforementioned cubic asymmetric loop antenna 70 installed in the communication terminal device 90 will be described.

Figure 27:
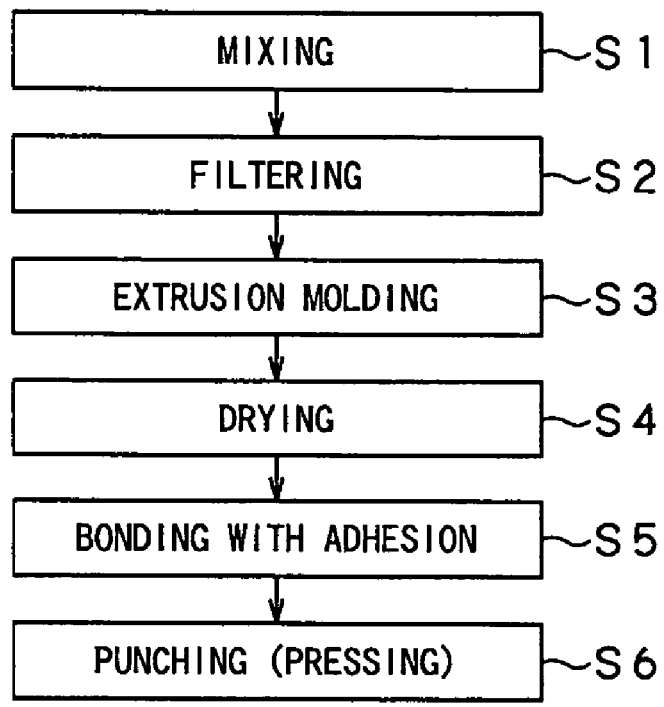
FIG. 27 shows a flow of steps in the process of magnetic sheet manufacture.

For manufacture of the cubic asymmetric loop antenna 70, first the aforementioned magnetic sheet 72 is made as in the flow chart in FIG. 27.

First in step S1, a magnetic paint is prepared by mixing a magnetic powder, solvent and additive in a rubber-resin binder for making the magnetic sheet 72. It should be noted that the magnetic powder is an Fe magnetic material containing Fe in 96 weight percents, Cr in 3 weight percents and Co in 0.3 weight percents and any other magnetic material.

Next in step S2, the magnetic paint is filtered to remove the magnetic powder having a grain diameter larger than a predetermined value from the binder.

Figure 28:
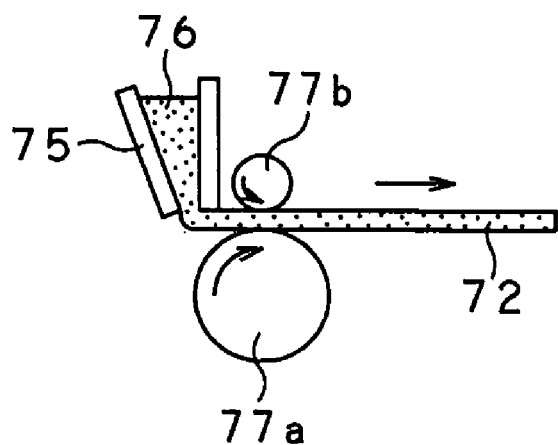
FIG. 28 is a schematic diagram of an extrusion molding machine.

In step S3, an extrusion molding machine shown in FIG. 28 is used for extruding a magnetic paint 76 in a reservoir 75 through between a pair of rollers 77a and 77b to form a long magnetic sheet 72 having a predetermined thickness.

Next in step S4, the long magnetic sheet 72 is dried and the binder is removed from the long magnetic sheet 72.

In step S5, an applicator shown in FIG. 29 is used to apply an adhesive 79 to one the main sides of a portion 72a of the strip-shaped magnetic sheet 72 being moved between a pair of rollers 78a and 78b.

Next in step S6, the strip-shaped magnetic sheet 72 is punched to have a predetermined shape.

With the above operations, the magnetic sheet 72 is formed as shown in FIGS. 30A and 30B.

Next, the aforementioned loop coil 71 is made as shown in FIG. 31. As having previously been described, the loop coil 71 is formed by etching or otherwise processing a conductive metal foil of an electrolytic copper or the like formed on both sides of a flexible insulation film or substrate 73 of polyimide, mica or the like. The method of forming the loop coil 71 is not limited to the above-mentioned one but the loop coil 71 may be formed by printing an electroconductive paste such as a silver paste on the film or substrate 73 to form a conductor pattern that provides the loop coil 71 or by sputtering a metal target to form, on the substrate 73, a conductor pattern that provides the loop coil 71. Also, the loop coil 71 has formed in the center thereof the through-hole 74 through which the magnetic sheet 72 is penetrated.

Figure 32:
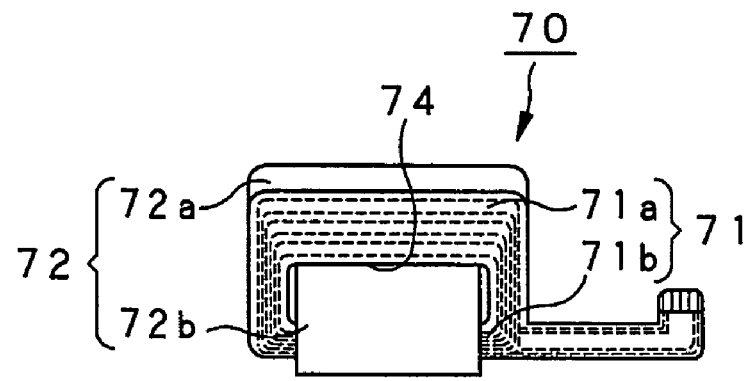
FIG. 32 is a plan view of the cubic asymmetric loop antenna.

Thereafter, the loop coil 71 and magnetic sheet 72 are attached to each other in one direction with the magnetic sheet 72 being penetrated at the narrow portion 72b thereof through the through-hole 74 in the loop coil 71 as shown in FIG. 32. At this time, the side of the magnetic sheet 72 applied with the adhesive 79 is disposed to face the main side of the loop coil 71, facing the IC card 1. At the lower winding section of the loop coil 71 where the winding interval is small, the narrow portion 72b of the magnetic sheet 72 is attached to the main side of the loop coil 71, facing the IC card 1. Thus, at the upper winding section of the loop coil 71 where the winding interval is large, the wide portion 72a of the magnetic sheet 72 can be attached to the aforementioned antenna reception concavity 97a of the communication terminal device 90.

The aforementioned cubic asymmetric loop antenna 70 can be produced as above. Namely, the cubic asymmetric loop antenna 70 has a structure easy to manufacture since the magnetic sheet 72 is penetrated through the through-hole 74 in the loop coil 71, laid on the loop coil 71 and attached with the adhesive 79 to the latter.

Figure 33:
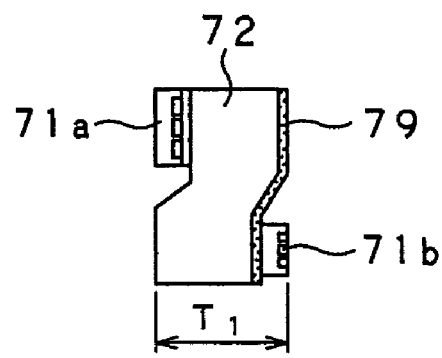
FIG. 33 is a sectional view of a substantial part of the cubic asymmetric loop antenna where the magnetic sheet is soft.
Figure 34:
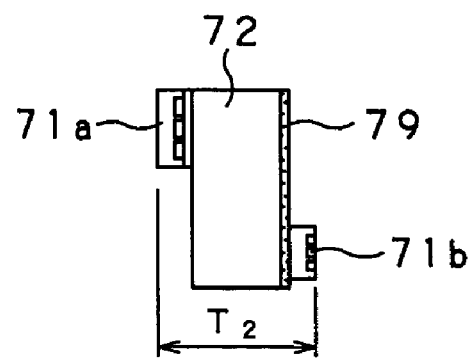
FIG. 34 is a sectional view of the substantial part of the cubic asymmetric loop antenna where the magnetic sheet is hard.

Also, the magnetic sheet 72 should preferably be relatively soft and flexible. In this case, deformation of the magnetic sheet 72 controls the deformation of the upper and lower winding sections 71a and 71b of the loop coil 71, so that the thickness $T_1$ of the entire cubic asymmetric loop antenna 70 can be reduced, as shown in FIG. 33. In case the magnetic sheet 72 is hard, however, the upper and lower winding sections 71a and 71b of the loop coil 71 will be deformed largely, so that the thickness $T_2$ of the entire loop coil 70 will be large, as shown in FIG. 34.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, in the antenna apparatus according to the present invention the specific permeability μ', and the product Ms·t of saturation magnetization Ms and thickness t, of the magnetic member disposed to face the main side of the loop coil, opposite to the main side facing the IC card, can be optimized to enhance the distribution of a magnetic field on the main side of the loop coil, facing the IC card, and provide a wider range of communications between the IC card and reader/writer (R/W). Therefore, the antenna apparatus and the communication apparatus using the antenna apparatus can be formed to be smaller and have a higher performance of communication.

The invention claimed is:

1. An antenna apparatus connected to a communication apparatus that makes data communication with a contactless integrated circuit card by electromagnetic inductive coupling, the antenna apparatus comprising:
    a loop coil for electromagnetic inductive coupling; and
    a magnetic member disposed to face a main side of the loop coil, opposite to a side of the loop coil facing the integrated circuit card, wherein the magnetic member has a specific permeability μ' and product Ms·t of saturation magnetization Ms and thickness t thereof based on a range set for facilitating communications with the contactless integrated circuit card; wherein the magnetic member has a wide portion wider than an outermost width of a winding section of the loop coil and a narrow portion narrower than an innermost width of the winding section; and the wide portion of the magnetic member is disposed to face the main side of the loop coil, opposite to the side of the loop coil facing the integrated circuit card, with the narrow portion being penetrated through a center of the loop coil, while the narrow portion is disposed to face a main side portion of the loop coil, facing the integrated circuit card and where a winding interval of the loop coil is narrow.

2. The antenna apparatus as set forth in claim 1, wherein the specific permeability μ' of the magnetic member is 30 or more and the product Ms·t of saturation magnetization Ms and thickness t is 6 emu/cm$^2$ or more.

3. The antenna apparatus as set forth in claim 1, wherein the magnetic member has a coercive force Hc of 100 e or less.

4. The antenna apparatus as set forth in claim 1, wherein the magnetic member is formed from a soft magnetic material.

5. The antenna apparatus as set forth in claim 4, wherein the soft magnetic material is a sintered compact of any one of amorphous alloy, Co—Cr alloy, Fe—Al alloy, Sendust alloy, Fe—Ni alloy, Fe—Co—Ni alloy and a ferrite alloy.

6. The antenna apparatus as set forth in claim 1, wherein:
the magnetic member has a wide portion wider than an outermost width of a winding section of the loop coil, a narrow portion formed between a pair of cuts made at one end and narrower than an innermost width of the winding section, and a pair of edge pieces formed across the narrow portion between the pair of cuts;
the wide portion of the magnetic member is disposed to face the main side of the loop coil, opposite to the side of the loop coil facing the integrated circuit card, with the narrow portion being penetrated through a center of the loop coil, while the narrow portion is disposed to face a main side portion of the loop coil, facing the integrated circuit card; and
the pair of edge pieces is disposed to face the main side of the loop coil, opposite to the side of the loop coil facing the integrated circuit card.

7. The antenna apparatus as set forth in claim 1, wherein the loop coil is formed from a plane winding of a conductor whose sections opposite to each other across a center of the loop coil are disposed to be different in interval from each other.

8. The antenna apparatus as set forth in claim 7, wherein mutually opposed winding sections of the loop coil are different in interval from each other in the direction in which the integrated circuit card is scanned.

9. The antenna apparatus as set forth in claim 7, wherein the loop coil is smaller than a loop coil at the integrated circuit card, to which it is to be inductively coupled.

* * * * *